United States Patent
Ray et al.

(10) Patent No.: US 10,742,441 B2
(45) Date of Patent: Aug. 11, 2020

(54) UNIFIED BUILDING MANAGEMENT SYSTEM

(71) Applicant: Johnson Controls Technology Company, Auburn Hills, MI (US)

(72) Inventors: Beth A. Ray, Oak Creek, WI (US); Sheri L. Meyer, Wauwatosa, WI (US); Radu M. Dorneanu, Greendale, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/287,773

(22) Filed: Feb. 27, 2019

(65) Prior Publication Data
US 2019/0199548 A1 Jun. 27, 2019

Related U.S. Application Data

(63) Continuation-in-part of application No. 16/261,301, filed on Jan. 29, 2019, which is a continuation-in-part
(Continued)

(51) Int. Cl.
*H04L 12/28* (2006.01)
(52) U.S. Cl.
CPC ...... *H04L 12/2827* (2013.01); *H04L 12/2809* (2013.01); *H04L 12/2816* (2013.01)
(58) Field of Classification Search
None
See application file for complete search history.

(56) References Cited

U.S. PATENT DOCUMENTS 6,148,306 A * 11/2000 Seidl .................. G05B 19/0426
6,792,319 B1 9/2004 Bilger
(Continued)

FOREIGN PATENT DOCUMENTS

| EP | 1 770 454 A1 | 4/2007 |
| WO | WO-2010/141601 A2 | 12/2010 |
| WO | WO-2016/180754 A1 | 11/2016 |

OTHER PUBLICATIONS

Anonymous: "Delta Building Management and Controls System". Internet Article. Retrieved from the Internet: URL:http://www.deltaww.com/filecenter/solu tions/download/05/Delta BMCS LDALISolution Guide 201608 eng.pdf?CID=23. Sep. 1, 2016. 17 pages.
(Continued)

*Primary Examiner* — Ryan A Jarrett
(74) *Attorney, Agent, or Firm* — Foley & Lardner LLP

(57) ABSTRACT

A controller for a space controls a plurality of devices, where each device is associated with one of a plurality of different building domains. The controller includes one or more processors operably coupled to one or more computer-readable storage media and configured to execute instructions stored in the computer-readable storage media to determine a plurality of use cases defined for the space, each use case associated with a required set of building domains, determine, for each of the different building domains, whether devices of building equipment are operational to serve the space, determine a set of enabled use cases by, for each use case, enabling the use case if devices of building equipment are operational to serve the space for each building domain in the required set of the different building domains and control the plurality of devices in accordance with the set of enabled use cases.

29 Claims, 16 Drawing Sheets

Related U.S. Application Data of application No. 16/132,045, filed on Sep. 14, 2018, now Pat. No. 10,599,115, which is a continuation-in-part of application No. 15/952,173, filed on Apr. 12, 2018, now Pat. No. 10,156,833.

(60) Provisional application No. 62/636,504, filed on Feb. 28, 2018, provisional application No. 62/623,939, filed on Jan. 30, 2018, provisional application No. 62/560,567, filed on Sep. 19, 2017, provisional application No. 62/485,282, filed on Apr. 13, 2017.

(56) References Cited

U.S. PATENT DOCUMENTS

| | | | |
|---|---|---|---|
| 6,909,921 | B1 | 6/2005 | Bilger |
| 9,459,607 | B2 | 10/2016 | Frazer et al. |
| 9,475,359 | B2 | 10/2016 | MacKay |
| 9,521,009 | B1 | 12/2016 | Skeffington |
| 9,733,656 | B2 | 8/2017 | Janoso et al. |
| 10,156,833 | B2 | 12/2018 | Ray et al. |
| 10,234,836 | B2 * | 3/2019 | Duchene ............... G05B 15/02 |
| 2004/0267385 | A1 | 12/2004 | Lingemann |
| 2007/0219645 | A1 | 9/2007 | Thomas et al. |
| 2008/0277486 | A1 | 11/2008 | Seem et al. |
| 2008/0281472 | A1 | 11/2008 | Podgorny et al. |
| 2009/0300174 | A1 | 12/2009 | Floris et al. |
| 2010/0262298 | A1 | 10/2010 | Johnson et al. |
| 2010/0280636 | A1 | 11/2010 | Holland et al. |
| 2010/0307731 | A1 | 12/2010 | Yonezawa et al. |
| 2010/0324962 | A1 | 12/2010 | Nesler et al. |
| 2011/0047418 | A1 | 2/2011 | Drees et al. |
| 2011/0087650 | A1 | 4/2011 | MacKay et al. |
| 2011/0093126 | A1 | 4/2011 | Toba et al. |
| 2011/0178977 | A1 | 7/2011 | Drees |
| 2012/0001487 | A1 | 1/2012 | Pessina |
| 2012/0029661 | A1 * | 2/2012 | Jones ............... G05B 19/0426 700/17 |
| 2012/0083937 | A1 | 4/2012 | Kong et al. |
| 2013/0218349 | A1 | 8/2013 | Coogan et al. |
| 2013/0257626 | A1 | 10/2013 | Masli et al. |
| 2013/0268128 | A1 | 10/2013 | Casilli et al. |
| 2013/0297259 | A1 | 11/2013 | Tsao et al. |
| 2014/0023363 | A1 | 1/2014 | Apte |
| 2014/0195664 | A1 | 7/2014 | Rahnama |
| 2014/0277765 | A1 | 9/2014 | Karimi et al. |
| 2014/0316582 | A1 | 10/2014 | Berg-Sonne et al. |
| 2015/0005900 | A1 * | 1/2015 | Steele ................... G05B 15/02 700/19 |
| 2015/0032265 | A1 | 1/2015 | Herring et al. |
| 2015/0066169 | A1 | 3/2015 | Nakano et al. |
| 2015/0088570 | A1 | 3/2015 | Yenni et al. |
| 2015/0140990 | A1 | 5/2015 | Kim et al. |
| 2015/0159893 | A1 | 6/2015 | Daubman et al. |
| 2015/0168926 | A1 | 6/2015 | Wood |
| 2015/0285527 | A1 * | 10/2015 | Kim ........................ F24F 11/64 700/276 |
| 2015/0293508 | A1 | 10/2015 | Piaskowski et al. |
| 2015/0312696 | A1 | 10/2015 | Ribbich et al. |
| 2015/0370927 | A1 | 12/2015 | Flaherty et al. |
| 2016/0020918 | A1 | 1/2016 | Lu |
| 2016/0095188 | A1 * | 3/2016 | Verberkt .............. H05B 47/105 315/151 |
| 2016/0147207 | A1 | 5/2016 | Park et al. |
| 2016/0258641 | A1 | 9/2016 | Cheatham et al. |
| 2016/0282825 | A1 | 9/2016 | Kariguddaiah |
| 2016/0320760 | A1 | 11/2016 | Brun et al. |
| 2017/0026194 | A1 | 1/2017 | Vijayrao et al. |
| 2017/0124842 | A1 | 5/2017 | Sinha et al. |
| 2017/0191695 | A1 | 7/2017 | Bruhn et al. |
| 2017/0195130 | A1 | 7/2017 | Landow et al. |
| 2017/0234067 | A1 | 8/2017 | Fasi et al. |
| 2017/0281819 | A1 | 10/2017 | Jones et al. |
| 2017/0350615 | A1 * | 12/2017 | Ashar ................... H04W 84/20 |
| 2017/0366414 | A1 | 12/2017 | Hamilton et al. |
| 2018/0005195 | A1 | 1/2018 | Jacobson |
| 2018/0101146 | A1 | 4/2018 | Hariharan et al. |
| 2018/0113897 | A1 | 4/2018 | Donlan et al. |
| 2018/0120778 | A1 * | 5/2018 | Billings ............... G05B 13/024 |
| 2018/0120788 | A1 | 5/2018 | Billings |
| 2018/0191197 | A1 | 7/2018 | Carr et al. |
| 2018/0210438 | A1 * | 7/2018 | Ashar ..................... G05B 15/02 |
| 2018/0270063 | A1 * | 9/2018 | Bard .................. G05B 19/0426 |
| 2018/0276775 | A1 | 9/2018 | Khurana et al. |
| 2018/0299845 | A1 | 10/2018 | Ray et al. |
| 2018/0314277 | A1 | 11/2018 | Moore et al. |
| 2019/0011894 | A1 | 1/2019 | Meyer et al. |
| 2019/0033802 | A1 | 1/2019 | Chatterjee et al. |
| 2019/0203532 | A1 * | 7/2019 | Feldstein .................. E06B 9/68 |
| 2019/0250575 | A1 * | 8/2019 | Jonsson ............... G05B 19/042 |

OTHER PUBLICATIONS

International Search Report and Written Opinion on International Patent Application No. PCT/US2018/027396 dated Jun. 27, 2018. 16 pages.

International Search Report and Written Opinion on International Patent Application No. PCT/US2018/051182 dated Nov. 22, 2018. 17 pages.

Rowland et al. "Designing Connected products: UX for the Consumer Internet of Things". May 31, 2015. pp. 2, 5-6, 8-14, 32-35,48-49, 52, 93, 95-99, 123, 307, 312, 395, 532, 613-625.

Sinopoli: "Smart Buildings Systems for Architects, Owners and Builders". Nov. 18, 2009. pp. 3-8, 129-136, chapters 3, 4, 5 and 6.

Wikipedia: "Building automation" Internet Article, Retrieved from the Internet: URL:https://en.wikipedia.org/w/index.php?title=Buildingautomation&oldid=799424260. Sep. 7, 2017. 12 pages.

Wikipedia: "Building management system", Internet Article, Retrieved from the Internet: URL:https://en.wikipedia.org/w/index.php?title=Building management system&oldid=797980461. Aug. 30, 2017. 4 pages.

Levin, "Preprocessing Data", URL: https://www.percona.com/blog/2011/08/08/preprocessingdata/, Aug. 8, 2011, 5 pages.

Yeh et al., "iPower: An Energy Conservation System for Intelligent Buildings by Wireless Sensor Networks," Inderscience Intl Jrnl of Sensor Networks, Year 2009, 9 pages.

\* cited by examiner

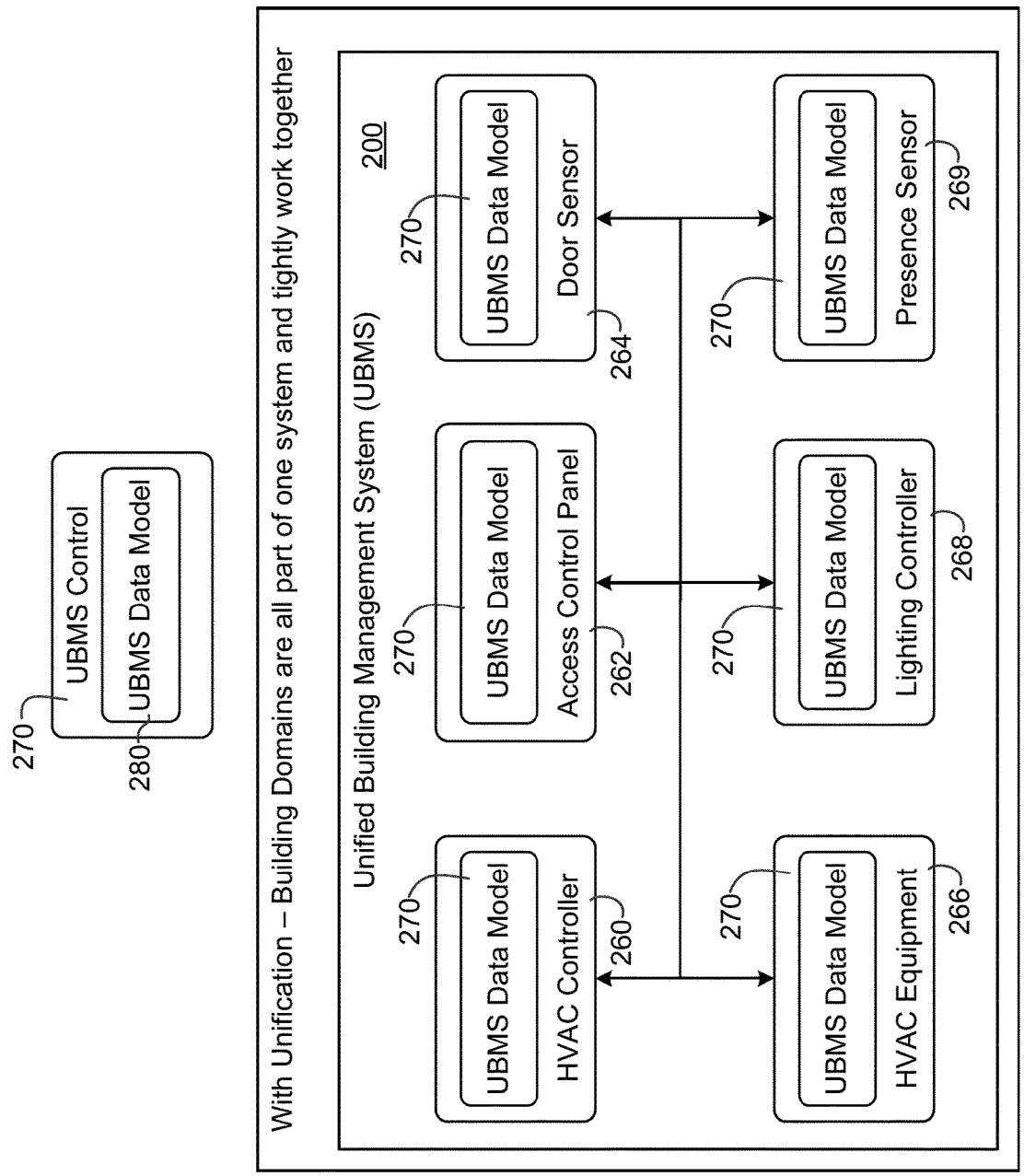

FIG. 10

SPACE USE CASE PROFILE

```
{
 "Space": "Main campus. Offices building. Conference room 102",
 "Use cases": [
  {
   "Conference": {
    "Authorization": "bd5235f69e4e4fb7a6e489f540a55353",
    "Trigger": "Use Case Selector",
    "Systems Present": [ "HVAC", "Lighting".....],
    "Modes": [
     {
      "Presentation": {
       "Systems": {
        "HVAC": {
         "Destination": {
          "Device": "192.168.1.1",
          "Object ID": 3000011
         },
         "Temperature": 72.5,
         "Tolerance": 1.5,
         "Units": "Deg F",
         "Required": "False"
        },
        "Lighting": {
         "Destination": {
          "Device": "192.168.2.1",
          "Object ID": 3000021
         },
         "Level": 100,
         "CCT": 4500,
         "Required": "False"
        },
        "Shades": {
         "Destination": {
          "Device": null,
          "Object ID": null
         },
         "Level": 20,
         "Required": "False"
        }
       },
       "Priority": "Medium"
      },
```

1102 → "Presentation"/"HVAC" Destination
1104 → "Lighting" Destination
1106 → "Shades" Destination

```
     {
      "Conversation": {
       "Systems": {
        "HVAC": {
         "Destination": {
          "Device": "192.168.1.1",
          "Object ID": 3000011
         },
         "Temperature": 72.5,
         "Tolerance": 1.5,
         "Units": "Deg F",
         "Required": "False"
        },
        "Lighting": {
         "Destination": {
          "Device": "192.168.2.1",
          "Object ID": 3000021
         },
         "Required": "False",
         "Level": 20,
         "CCT": 2800
        },
        "Shades": {
         "Level": 80,
         "Destination": {
          "Device": null,
          "Object ID": null
         },
         "Required": "False"
        },
        "Priority": "Medium"
       },
      }
     }
    ]
   }
  }
 ]
}
```

1102 → "Conversation"/"HVAC" Destination
1104 → "Lighting" Destination
1106 → "Shades" Destination

1100

UNIFIED BUILDING MANAGEMENT SYSTEM

CROSS-REFERENCE TO RELATED APPLICATION

This application claims the benefit of and priority to U.S. Provisional Patent Application No. 62/636,504, filed Feb. 28, 2018. This application is also a continuation-in-part of U.S. patent application Ser. No. 16/261,301, filed Jan. 29, 2019, which claims the benefit of and priority to U.S. Provisional Patent Application No. 62/623,939, filed Jan. 30, 2018 and is a continuation-in-part of U.S. patent application Ser. No. 16/132,045, filed Sep. 14, 2018. U.S. patent application Ser. No. 16/132,045 claims the benefit of and priority to U.S. Provisional Patent Application 62/560,567, filed Sep. 19, 2017, and is a continuation-in-part of U.S. patent application Ser. No. 15/952,173, filed Apr. 12, 2018. U.S. patent application Ser. No. 15/952,173 claims the benefit of and priority to U.S. Provisional Patent Application No. 62/485,282, filed Apr. 13, 2017. The disclosures of each of the foregoing patent applications are incorporated by reference herein in their entireties.

BACKGROUND

The present disclosure relates generally to building domain systems (BDSs). A BDS is, in general, a system configured to control, monitor, and manage devices of a building domain in or around a building or building area. As used herein, "devices" includes any building equipment, devices, apparatuses, sensors, etc. that provide measurements or data relating to a space or that can be controlled to change the condition of a space (e.g., light level, locked/unlocked, temperature, humidity). Accordingly, as used herein "devices" includes (and is not limited to) HVAC equipment (e.g., air handling units, chillers, variable refrigerant flow units), thermostats, light fixtures, locks, sensors (detectors for smoke, heat, gas, flames, carbon monoxide, glass breaks, motion, and light; sensors that measure temperature, humidity, carbon dioxide, ambient light, and occupancy; presence/identity sensors (e.g., card readers, RFID receivers); cameras (e.g., video capture, image capture) and microphones), and other apparatuses (e.g., sound systems, blinds/shades, appliances, garage doors, medical devices, beds, televisions). As used herein, "building domains" refers to groupings of devices based on services/functions typically provided by those devices. For example, "building domains" may include (and are not limited to) an HVAC domain, a lighting domain, a security domain (e.g., surveillance and access), a fire domain, an audio-visual device domain, business systems domains (e.g., financial systems domain, email and calendar systems domain), etc. For example, a light fixture is said to be associated with the lighting domain. As another example, a chiller is said to be associated with the HVAC domain. Herein, a device may be referred to as being associated with, included with, part of, etc. a building domain without requiring that the device be included in a conventional BDS as described below.

Conventionally, a BDS is a domain-specific system that manages equipment of a particular building domain, for example a HVAC system, a security system, a lighting system, or a fire alerting system. Although in some cases multiple domain-specific systems have been placed in communication with one another as discussed below, such integrated systems do not capture the full potential of interoperability and interdependence between building devices.

SUMMARY

One implementation of the present disclosure is a controller for a space served by a plurality of devices. Each device is associated with one of a plurality of different building domains. The controller includes one or more processors operably coupled to one or more computer-readable storage media and configured to execute instructions stored in the computer-readable storage media to determine a plurality of use cases defined for the space, each use case associated with a required set of building domains, determine, for each of the different building domains, whether devices of building equipment are operational to serve the space, determine a set of enabled use cases by, for each use case, enabling the use case if devices of building equipment are operational to serve the space for each building domain in the required set of building domains and control the plurality of devices in accordance with the set of enabled use cases.

In some embodiments, the one or more processors are configured to execute instructions stored in the computer-readable storage media to obtain an indication that an additional device associated with an additional domain became operational to serve the space and extend a first use case of the set of enabled use cases to include the additional domain.

In some embodiments, the devices operational to serve the space include a first device associated with a first domain and the additional device associated with the additional domain. The one or more processors are configured to execute instructions to extend the first use case of the set of enabled use cases to include the additional domain by enabling a portion of the use case corresponding to the additional domain and modifying a portion of the use case corresponding to the first domain.

In some embodiments, the one or more processors are configured to execute instructions stored in the computer-readable storage media to determine that the devices of building equipment for a first domain of the plurality of different building domains became non-operational and update the set of enabled use cases by, for each use case in the set of enabled use cases, disabling the use case if the required set of building domains for the use case comprises the first domain.

In some embodiments, the one or more processors are configured to execute instructions stored in the computer-readable storage media to obtain an indication that an additional device associated with an additional domain became operation to serve the space and update the set of enabled use cases by enabling a first use case of the plurality of space use cases, the set of required domains for the first use case comprising the additional domain and disabling a second use case of the set of enabled use cases in response to a determination that the first use case is preferred over the second use case.

In some embodiments, each use case specifies a trigger condition and settings for a subset of the devices. The one or more processors are configured to execute instructions to control the plurality of devices in accordance with the set of enabled use cases by detecting an occurrence of the trigger condition and in response to detecting the occurrence of the trigger condition, distributing the settings to the subset of devices. Distributing the settings to the subset of the devices causes the subset of devices to operate in accordance with the settings.

In some embodiments, the one or more processors are configured to execute the instructions to determine, for each of the different building domains, whether devices of building equipment are operational to serve the space by detecting a presence of the devices and obtaining, for each of the devices, an indication of a domain of the device. In some embodiments, obtaining the indication of the domain of the device comprises reading a device domain attribute from a common data model used by the one or more processors and the devices.

In some embodiments, the one or more processors are configured to execute instructions to for each building domain for which devices are determined to be operational, determine a type of each of the devices, enable capabilities of the enabled use cases based on the types, and control the devices to provide the capabilities in accordance with the enabled use cases. In some embodiments, the one or more processors are configured to execute instructions to determine that a device of a first type has become non-operational and disable a first capability corresponding to the first type.

In some embodiments, the one or more processors are configured to execute instructions to disable a first capability of the enabled use cases in response to enabling a second capability of the enabled use cases, the second capability preferred over the first capability.

Another implementation of the present disclosure is a method of controlling a plurality of devices that serve a space. Each device is associated with one of a plurality of different building domains. The method includes determining a plurality of use cases defined for the space. Each use case is associated with a required set of building domains. The method also includes determining, for each of the different building domains, whether devices of building equipment are operational to serve the space, determining a set of enabled use cases by, for each use case, enabling the use case if devices of building equipment are operational to serve the space for each building domain in the required set of the different building domains, and controlling the plurality of devices in accordance with the set of enabled use cases.

In some embodiments, the method includes obtaining an indication that an additional device associated with an additional domain became operation to serve the space and extending a first use case of the set of enabled use cases to include the additional domain.

In some embodiments, the method includes determining that the devices of building equipment for a first domain of the plurality of different building domains became non-operational and updating the set of enabled use cases by, for each use case in the set of enabled use cases, disabling the use case if the required set of building domains for the use case comprises the first domain.

In some embodiments, the method includes obtaining an indication that an additional device associated with an additional domain became operation to serve the space and updating the set of enabled use cases by enabling a first use case of the plurality of space use cases (where the set of required domains for the first use case includes the additional domain) and disabling a second use case of the set of enabled use cases in response to a determination that the first use case is preferred over the second use case.

In some embodiments, each use case specifies a trigger condition and settings for a subset of the devices and controlling the plurality of devices in accordance with the set of enabled use cases includes detecting an occurrence of the trigger condition and, in response to detecting the occurrence of the trigger condition, distributing the settings to the subset of devices. Distributing the settings to the subset of the devices causes the subset of devices to operate in accordance with the settings.

In some embodiments, determining, for each of the different building domains, whether devices of building equipment are operational to serve the space includes detecting a presence of the devices and obtaining, for each of the devices, an indication of a domain of the device. In some embodiments, obtaining the indication of the domain of the device includes reading a device domain attribute from a common data model used by the one or more processors and the devices.

In some embodiments, the method includes, for each building domain for which devices are determined to be operational, determining a type of each of the devices, enabling capabilities of the enabled use cases based on the types, and controlling the devices to provide the capabilities in accordance with the enabled use cases.

In some embodiments, the method includes determining that a device of a first type has become non-operational and disabling a first capability corresponding to the first type. In some embodiments, the method includes disabling a first capability of the enabled use cases in response to enabling a second capability of the enabled use cases, the second capability preferred over the first capability.

In some embodiments, enabling the use case includes retrieving a use case profile from a repository and installing the use case profile on a space controller. In some embodiments, the method includes populating a destination field of a use case profile for each device in the subset of the devices. The destination field facilitates network communications between a space controller and the device.

Another implementation of the present disclosure is one or more non-transitory computer-readable media containing program instructions that, when executed by one or more processors, cause the one or more processors to perform operations that include determining a plurality of use cases defined for the space, each use case associated with a required set of building domains, determining, for each of the different building domains, whether devices of building equipment are operational to serve the space, determining a set of enabled use cases by, for each use case, enabling the use case if devices of building equipment are operational to serve the space for each building domain in the required set of the different building domains, and controlling the plurality of devices in accordance with the set of enabled use cases.

In some embodiments, the operations further include obtaining an indication that an additional device associated with an additional domain became operation to serve the space and extending a first use case of the set of enabled use cases to include the additional domain.

In some embodiments, each use case specifies a trigger condition and settings for a subset of the devices and controlling the plurality of devices in accordance with the set of enabled use cases includes detecting an occurrence of the trigger condition and, in response to detecting the occurrence of the trigger condition, distributing the settings to the subset of devices. Distributing the settings to the subset of the devices causes the subset of devices to operate in accordance with the settings.

In some embodiments, determining, for each of the different building domains, whether devices of building equipment are operational to serve the space includes detecting a presence of the devices and obtaining, for each of the devices, an indication of a domain of the device. In some embodiments, the operations include, for each building domain for which devices are determined to be operational, determining a type of each of the devices, enabling capabilities of the enabled use cases based on the types, and controlling the devices to provide the capabilities in accordance with the enabled use cases.

In some embodiments, enabling the use case comprises populating a destination field of a use case profile for each device in the subset of the devices. The destination field facilitates network communications between a space controller and the device.

BRIEF DESCRIPTION OF THE DRAWINGS

FIG. 2C is an illustration of the unified building management system with a common data model, according to an exemplary embodiment.

FIG. 10 is a depiction of an example of a space use case profile, according to an exemplary embodiment.

DETAILED DESCRIPTION

Referring to the FIGURES generally, a series of comparisons are shown between conventional building domain systems (BDSs) and the unified building management system (UBMS) disclosed herein. The FIGURES illustrate the advantages of the UBMS, including seamless interoperability across building domains, modular expansion of the UBMS to include additional devices and domains over time, and operation of the UBMS to provide space use cases that facilitate users in accomplishing jobs at a space. These and other advantages of the UBMS disclosed herein are described in detail below.

Conventional Building Management System

Figure 1A:
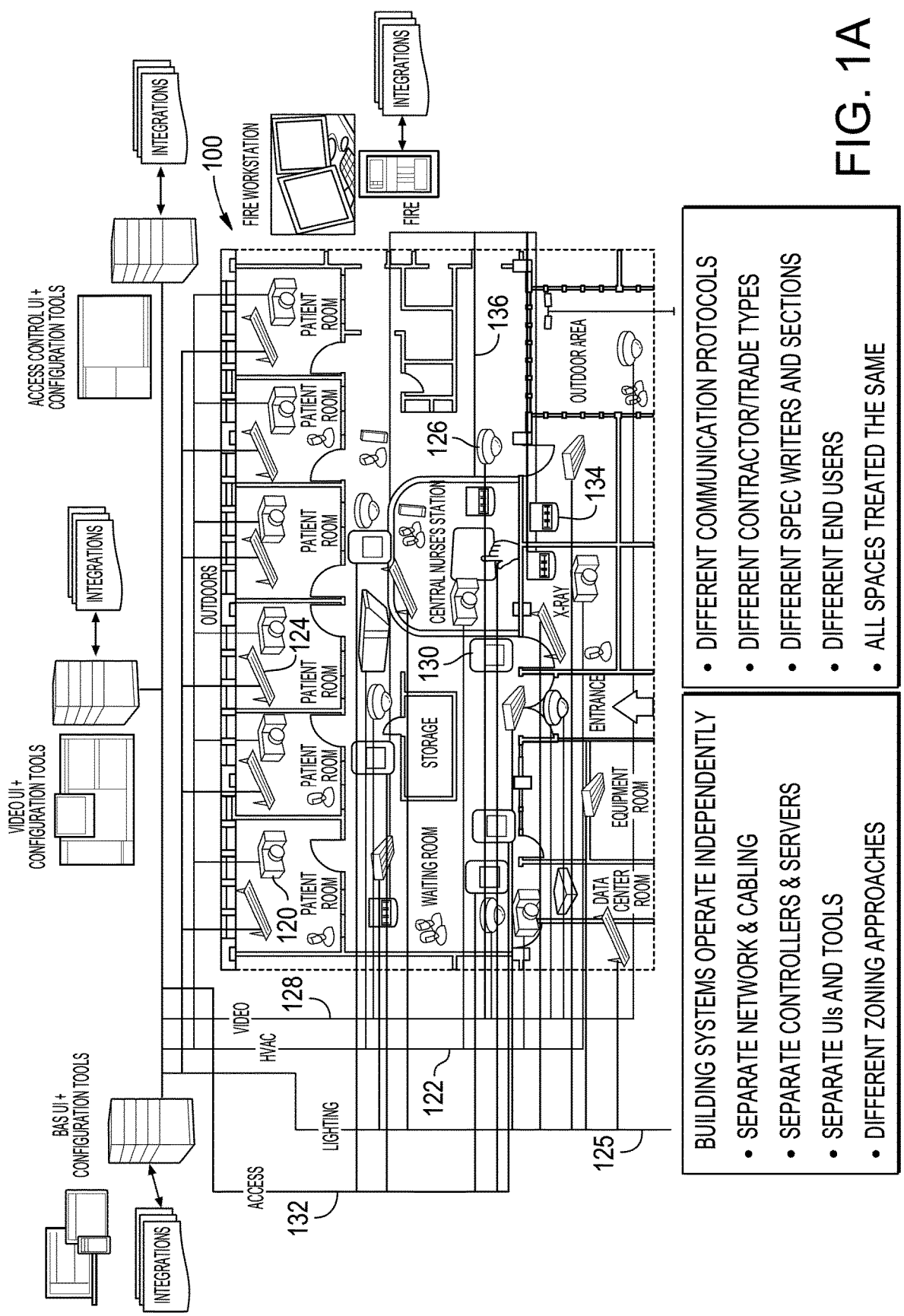
FIG. 1A is a diagram of conventional building domain systems for a place, according to an exemplary embodiment.
Figure 1B:
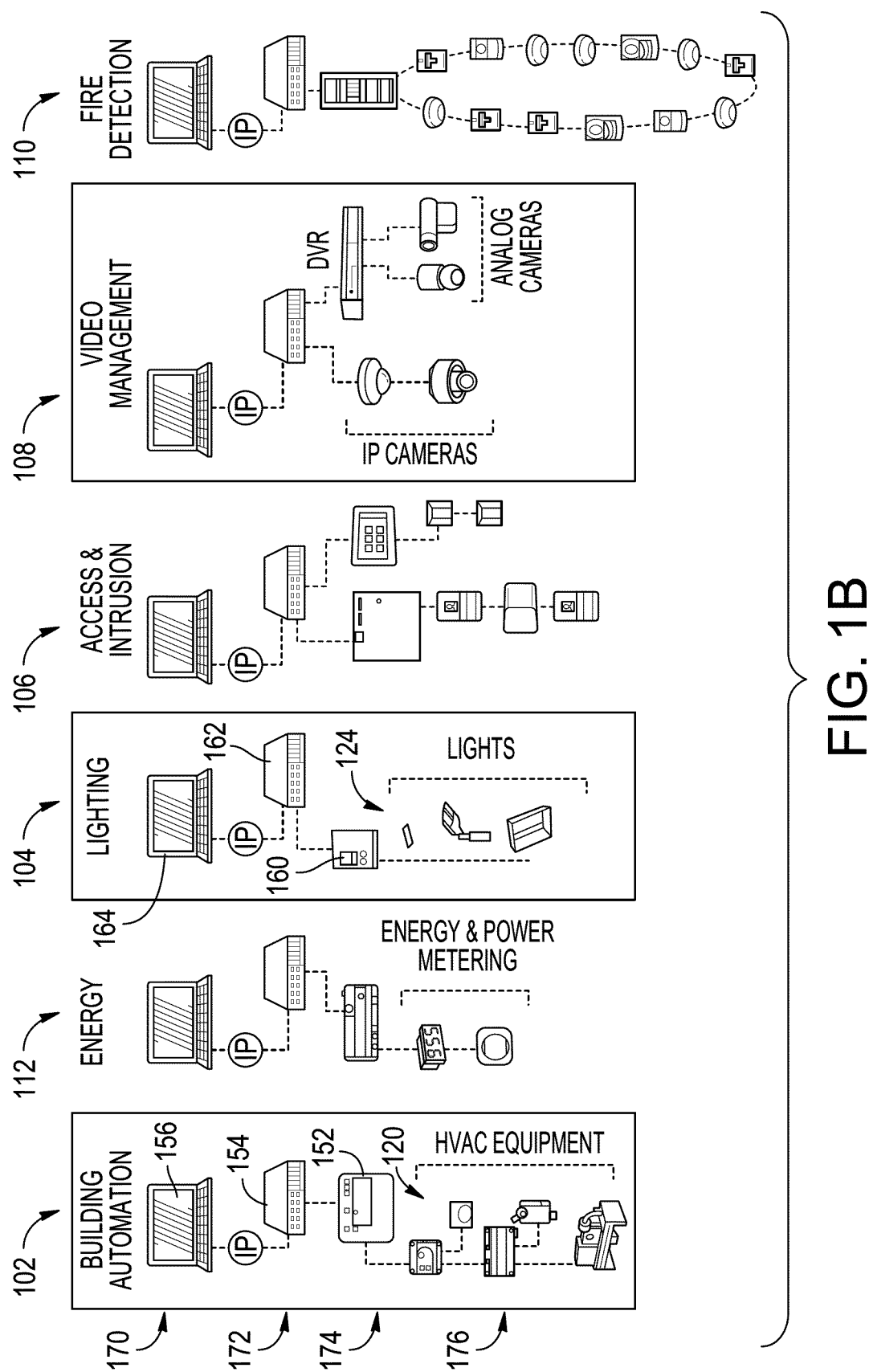
FIG. 1B is a visualization of the system architecture of conventional building domain systems, according to an exemplary embodiment.
Figure 1C:
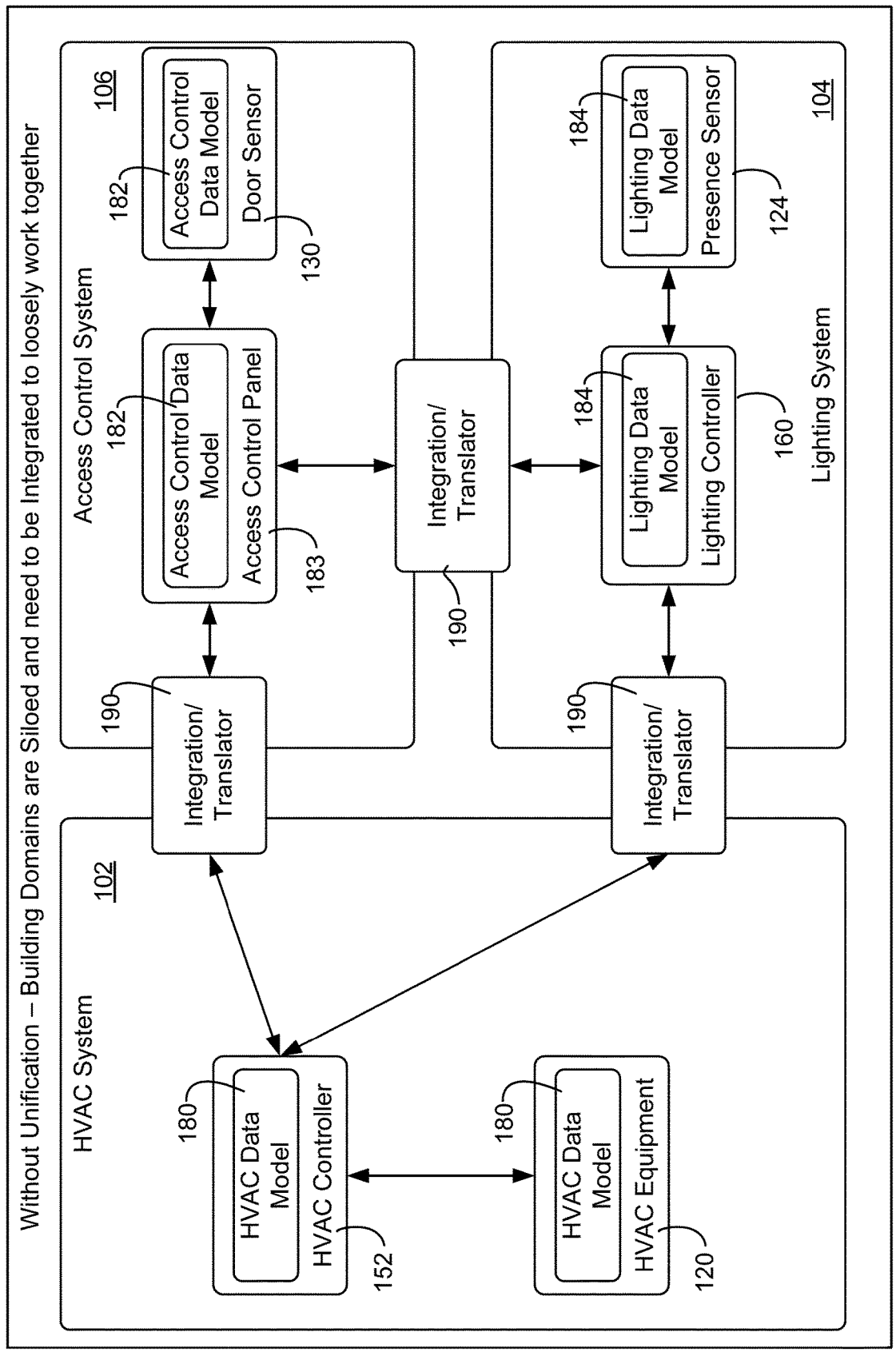
FIG. 1C is an illustration of data models and integrators in conventional building domain systems, according to an exemplary embodiment.

Referring now to FIGS. 1A-C, several depictions of conventional BDSs are shown. FIGS. 1A-C show conventional BDSs, and are included for the sake of comparison to the UBMS illustrated in FIGS. 2-11. FIG. 1A is a diagram of five independently-operating conventional BDSs for a place 100 (e.g., a building and surrounding outdoor areas). More particularly, an HVAC system 102, a lighting system 104, an access system 106, a video system 108, and a fire system 110 are shown with place 100. In conventional BDSs, systems 102-110 operate independently, resulting in widespread complexity. Each of the HVAC system 102, lighting system 104, access system 106, video system 108, and fire system 110 have separate networks and cabling, controllers and servers, and user interfaces. For example, HVAC devices 120 are connected by HVAC cabling 122, while lighting devices 124 are connected by lighting cabling 125, video devices 126 are connected by video cabling 128, access devices 130 are connected by access cabling 132, and fire devices 134 are connected by fire cabling 136. Even when wireless networks are used instead of physical cabling, the wireless networks supporting each building system are generally separate. Furthermore, different network protocols may be used by the various systems, for example LonWorks, MSTP, BACnet, etc., inhibiting interconnectivity. In sum, systems 102-110 are implemented and installed as physically and electronically isolated systems.

FIG. 1B shows another visualization of how conventional BDSs are siloed (e.g., isolated from each other), requiring multiple integration layers to facilitate communication between systems, and illustrates that each system has its own controller, server, and user interface. In addition to HVAC system 102, lighting system 104, access system 106, video system 108, and fire system 110, FIG. 1B also shows energy system 112. Conventionally, as shown in FIG. 1B, systems 102-112 are independent of one another. For example, HVAC devices 120 are connected to a HVAC controller 152 and an HVAC server 154, and can be controlled or monitored by a user via HVAC user interface 156, while lighting devices 124 are connected to a lighting controller 160 and a lighting server 162, and can be controlled or monitored by a user via lighting user interface 164. The energy system 112, access system 106, video system 108, and fire system 110 have similar architectures, such that each system 102-112 has separate controllers, servers, and user interfaces. In some cases, attempts have been made to integrate one or more BDSs, for example by introducing an integrator that translates data for transfer between HVAC server 154 and lighting server 162 or that takes HVAC user interface 156 and lighting user interface 164 and presents both in a single application. To provide customer value from integration in conventional systems, integration is required at multiple levels (e.g., at user interface level 170, the server level 172, the controller level 174, and the equipment level 176), and even then provides limited interoperability or interdependent functionality, for example for reasons explained with reference to FIG. 1C below.

FIG. 1C shows that the data models for each conventional BDS are different, complicating interconnection. "Data model" refers to the data structures, addressing, tagging, command formats, variable/setting names, etc. used by the BDSs to send instructions to and receive data from equipment and to present data relating to building operations to users, represented in FIG. 1C as HVAC data model 180, access control data model 182, and lighting data model 184. As shown, the HVAC data model 180 is used in HVAC system 102 by HVAC controller 152 and HVAC equipment 120, the access control data model 182 is used in the access control system 106 by the access control panel 183 and the access device (e.g., door sensor) 130, and the lighting data model 184 is used in the lighting system 104 by the lighting controller 160 and the lighting device (e.g., presence sensor) 124. The data models differ between domains, such that the data structures, addressing, tagging, command formats, variable/setting names, etc. are different for each of the HVAC data model 180, access control data model 182, and lighting data model 184. For example, the way the HVAC data model 180 identifies a space in a building (e.g., "room 3, floor 2") may be different than the way the lighting data model 184 identifies that space (e.g., "space B3") and the divisions between spaces defined in the different data models may not align (e.g., "room 3, floor 2" may overlap with "space B3" but include some areas not in "space B3"). Coordination between the HVAC system 102 and the lighting system 104 for that space thus requires translation between languages used by the data models, while in some cases no one-to-one translation of a data object or attribute exists.

More generally, because the data models differ between BDS for the different domains, sending information between BDS (e.g., between HVAC controller 152, access control panel 188, and lighting controller 160) requires an integration process to translate information as captured in a first data model into a structure compatible with a second data model another (e.g., from the HVAC data model to the lighting data model). Thus, FIG. 1C shows integration/translator modules 190 that perform integration processes to translate information between two data models. A separate integration process may be required for each direction, for example from the HVAC data model 180 to the access control data model 182 in addition to from the access control data model 182 to the HVAC data model 180. Thus, for a system as in FIG. 1B with six different BDSs, providing two-way interactions between all six systems requires thirty separate integrations, perhaps more if integration is attempted at multiple architecture levels (e.g., between servers, between controllers, and between devices), resulting in substantial system complexity. Furthermore, integration slows data transfer and may distort data or introduce error, diminishing the efficiency and effectiveness of the overall combination of BDSs.

Unified Building Management System (UBMS)

Referring now to FIGS. 2-11, a unified building management system (UBMS) 200 is shown, according to exemplary embodiments. As shown in FIG. 2A, the UBMS 200 includes HVAC devices 202, lighting devices 204, access devices 206, video devices 208, and fire devices 210 that serve multiple spaces in place 100. The HVAC devices 202, lighting devices 204, access devices 206, and video devices 208 are connected via a common network (e.g., common cabling, shared wireless network). Fire devices 210 may also be connected to the common network and/or may have a separate network 214 as shown to provide extra reliability or redundancy for safety-critical functions and/or to comply with regulatory requirements. The devices 202-210 are communicable using a common protocol (e.g., BACnet, MSTP, LonWorks, TCP/IP) and are connected to a common server 201. The common network 212 saves costs, materials, time etc. in installation, operation, and maintenance as compared to the multitude of networks used for the combination of BDSs shown in FIG. 1A. The common network 212 and the common protocol also facilitate other beneficial interconnectivity, interdependence, redundancy, etc. for the UBMS 200, as described in detail below.

Figure 2A:
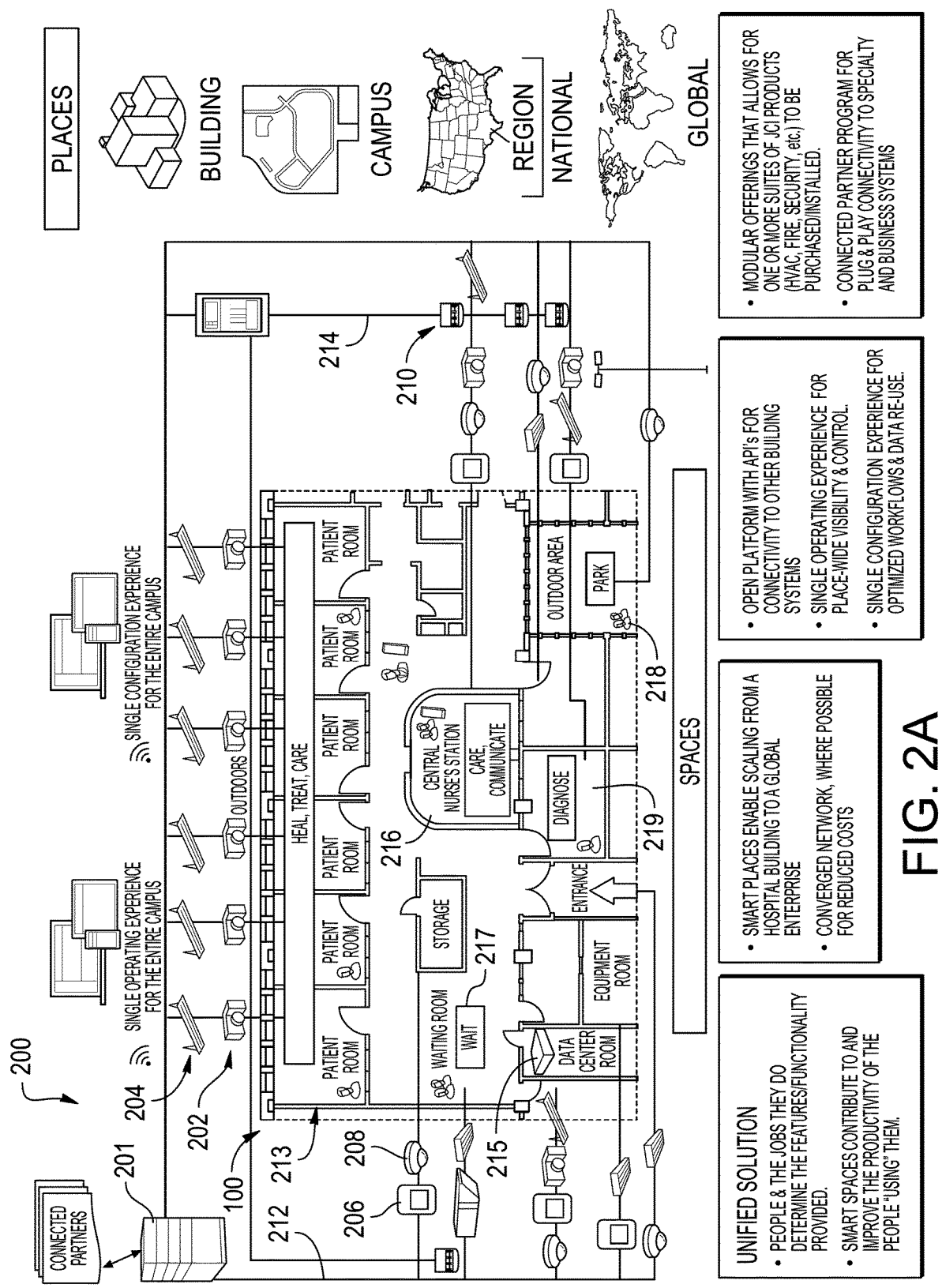
FIG. 2A is a diagram of a unified building management system for the place of FIG. 1A, according to an exemplary embodiment.

In the UBMS 200, devices 202-210 are primarily associated with spaces in place 100 that the devices serve. Place 100 in the example of FIG. 2A is a medical facility that includes the following spaces: patient rooms 213, data center room 215, nurses' station 216, waiting room 217, outdoor area 218, and doctor's office 219. As opposed to dealing with what domain a device belongs to, the UBMS 200 focuses on spaces, the mission of a space, and the people that use those spaces. For example, patient rooms 213 are shown with missions "heal, treat, care," as well as with an HVAC device 202 and lighting device 204 for each, while the outdoor area 218 has the mission "park" and is served by a video device 208. The UBMS 200 manages and controls the devices that serve each space (e.g., each patient room 213) in order to fulfill the mission of the space. Facilitated by the removal of complexities and barriers found in simultaneous use of multiple BDSs, the UBMS 200 coordinates devices independent of domain to align devices, people, spaces, places, and missions.

Figure 2B:
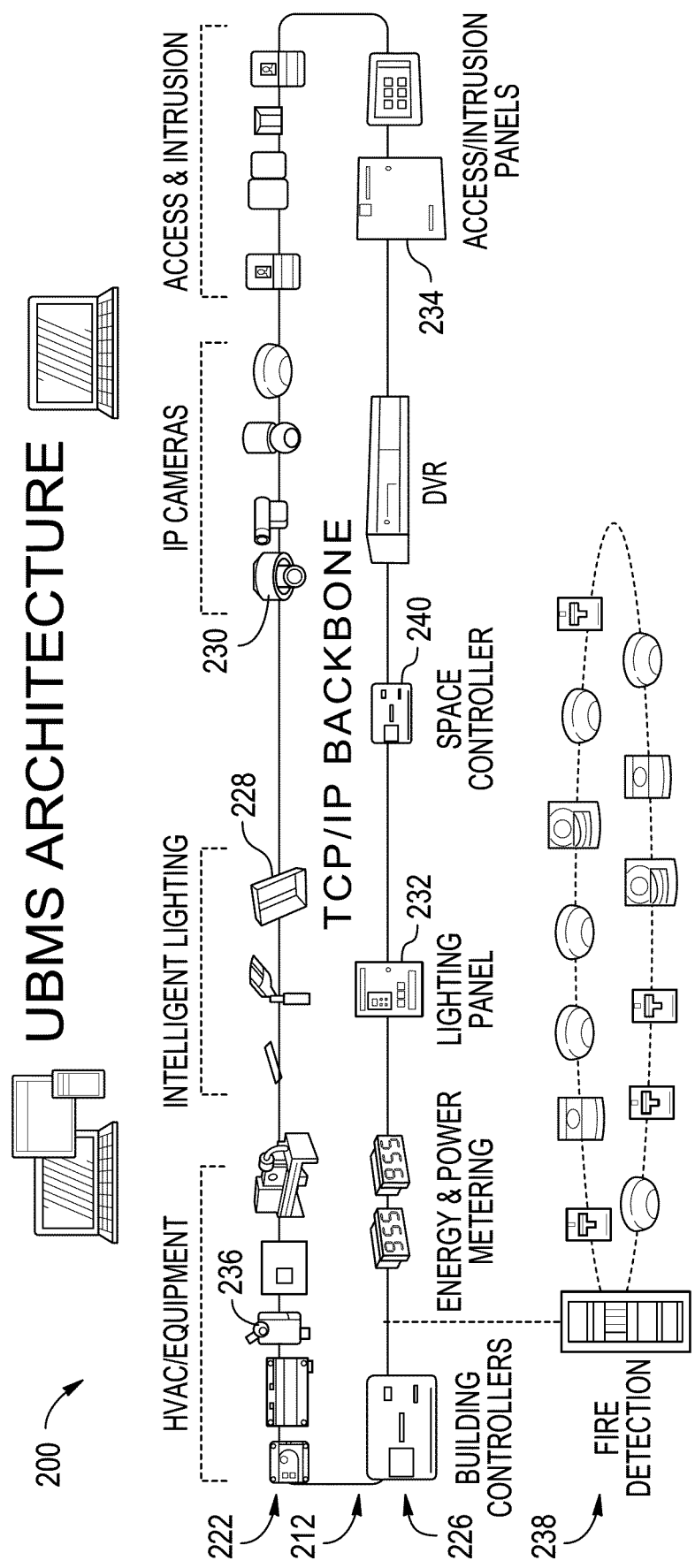
FIG. 2B is a visualization of the system architecture of the unified building management system, according to an exemplary embodiment.

FIG. 2B shows an illustration of the UBMS architecture 220, which can be compared to the conventional BDS architectures of FIG. 1B. In the UBMS architecture 220, building equipment/devices 222 (e.g., HVAC equipment, lighting devices, cameras, access and intrusion devices) are connected via a common network 212 (e.g., TCP/IP Backbone) to each other and to each of the controllers and control panels 226 (e.g., building controllers, energy and power meters, lighting panels, DVR, access/intrusion panel, space controller). In other words, the common network 212 facilitates communication between equipment/devices 222 (e.g., between a light 228 and a security camera 230), between controllers/panels 226 (e.g., between lighting panel 232 and access/intrusion panel 234), and between equipment/devices 222 and controllers/panels 226 (e.g., between an HVAC device 236 and lighting panel 232). In some embodiments, additional domains are included by communication between the common network 212 and a system controller, for example as shown for fire domain 238 in FIG. 1B. The space controller 240 provides a unifying space-centered control approach to the UBMS based on the spaces and missions mentioned with reference to FIG. 2A. User interfaces 250 are configured to allow a user to configure, control, monitor, and manage the UBMS across all domains in a unified user experience, also as described in detail below.

FIG. 2C illustrates how a common UBMS data model further unifies domains in the UBMS 200. An example UBMS 200 is shown with an HVAC controller 260, an access control panel 262, a door sensor 264, HVAC equipment 266, lighting controller 268, and presence sensor 269. In contrast to FIG. 1C where devices and controllers of different domains are shown with different data models, the UBMS 200 has a UBMS common data model 270 used by the HVAC controller 260, an access control panel 262, a door sensor 264, HVAC equipment 266, a lighting controller 268, and a presence sensor 269. In other words, these components 260-269 share a way of structuring data and identifying devices, spaces, and places to facilitate communication between the components 260-269 that allows for control based on spaces and places. The UBMS 200 is therefore a single, unified, multi-domain system that does not require translations or integrations to provide interoperability, communication, and interdependence between devices, equipment, and controllers of different domains. The integrators/translators 190 and the associated delays, errors, and complexities discussed in reference to FIG. 1C are rendered obsolete by the more efficient UBMS 200 and UBMS common data model 270. For example, an overarching UBMS control 280 using the UBMS common data model 270 may be provided to seamlessly manage, monitor, and control devices of all domains within the UBMS 200.

According to various embodiments, components of the UBMS 200 can be installed and run on the premises (i.e., physically in the physical space and/or place served by the UBMS), in the cloud, at a remote enterprise server, or in some combination thereof. With the exception of those components with functions that require them to be located in a particular space (e.g., sensors that measure something in a space, lights that light up a space), other elements (e.g., controllers, servers, network interfaces, user interface generators, user devices used to access user interfaces of the UBMS 200) can be physically located anywhere. In some cases, a UBMS controller is distributed throughout devices of building equipment, such that computing components of various devices managed by the UBMS 200 combine to provide the UBMS computing/control functionalities described herein. It should be understood that many implementations are possible.

Referring generally to FIGS. 3-11, various embodiments are shown in which the UBMS 200 is configured for modular expansion, for example to add an additional building domain to an existing UBMS. For example, a customer of the UBMS 200 may desire to start with a UBMS 200 that covers three building domains, while not covering other building domains that the UBMS 200 is capable of managing (e.g., due to budget constraints, construction timeline constraints). The UBMS 200 will be configured for the first three building domains, including defining spaces, places, and other data configurations in the common data model. The customer may then decide to add a fourth building domain to the UBMS 200 (e.g., to install device for a fourth building domain at a building). The UBMS 200 can automatically recognize and reuse all spaces, places, and other data configurations in configuring the fourth building domain for inclusion in the UBMS 200.

In some embodiments, modular expansion also includes the ability of a new domain to reuse hardware and software installed for previous domains. For example, if the existing lighting system already includes occupancy sensors for a space, the installation of new occupancy sensors for HVAC can be avoided when adding HVAC to the UBMS 200, because the existing occupancy sensors can be used for both lighting and HVAC functions. Thus, upon expansion, devices only need to be added when functionality cannot be used from or enabled on devices that have already been installed. As another example, because the spaces and places are already configured for the existing domains in the UBMS 200, adding a new domain does not require reprogramming of building spaces, places, and other configurations. In contrast, adding a separate, conventional BDS for a new building domain would require independent configuration of the spaces and places that the equipment for that domain.

Still referring generally to FIGS. 3-11, UBMS-compliant devices can easily be added to the UBMS 200. For example, the UBMS common data model may be provided to vendors of specialty building equipment and internet-of-things devices along with verification and validation tools, software development kits, etc. to allow the vendors to produce UBMS-compliant devices (i.e., devices that use the common data model and can connect to the common network using the common protocol). The UBMS 200 is configured to add such devices without core reconfiguration of software or hardware of the UBMS 200 or the devices.

As described in detail below, space use cases may be enabled or disabled for a space depending on the devices or domains available at a space. A "space use case" is a behavior of a set of devices of building equipment 302 available for operation at a space that facilitates a user in accomplishing a corresponding job at the space. A space use case may correspond to a collection of settings for devices of the building equipment 302 and/or other control logic or applications that provide the desired behavior of the building equipment 302. In some embodiments, a space use case is associated with a trigger condition. When the trigger condition occurs, the space use case is activated, for example by distributing settings for the space use case to the building equipment 302.

Because each space use case corresponds to a particular collection of types of devices of building equipment 302 available at a space, the space use cases enabled for a space may change when a new device becomes operational at the space or a new domain becomes operational for the space. In some cases, a part or portion of a space use case may be enabled or disabled to adjust for the availability or unavailability of a particular type of device. For example, a space use case that involves control of devices of two building domains may be extended to include control of a device of a third building domain when the third building domain is installed at a space. In some cases, when additional domains are added to the UBMS 200, the UBMS 200 gains new cross-domain space use cases, for example based on application logic that runs across both a previously-operating domain and the new domain.

These and other advantages of the UBMS 200 are described in detail below with reference to FIGS. 3-11.

Figure 3A:
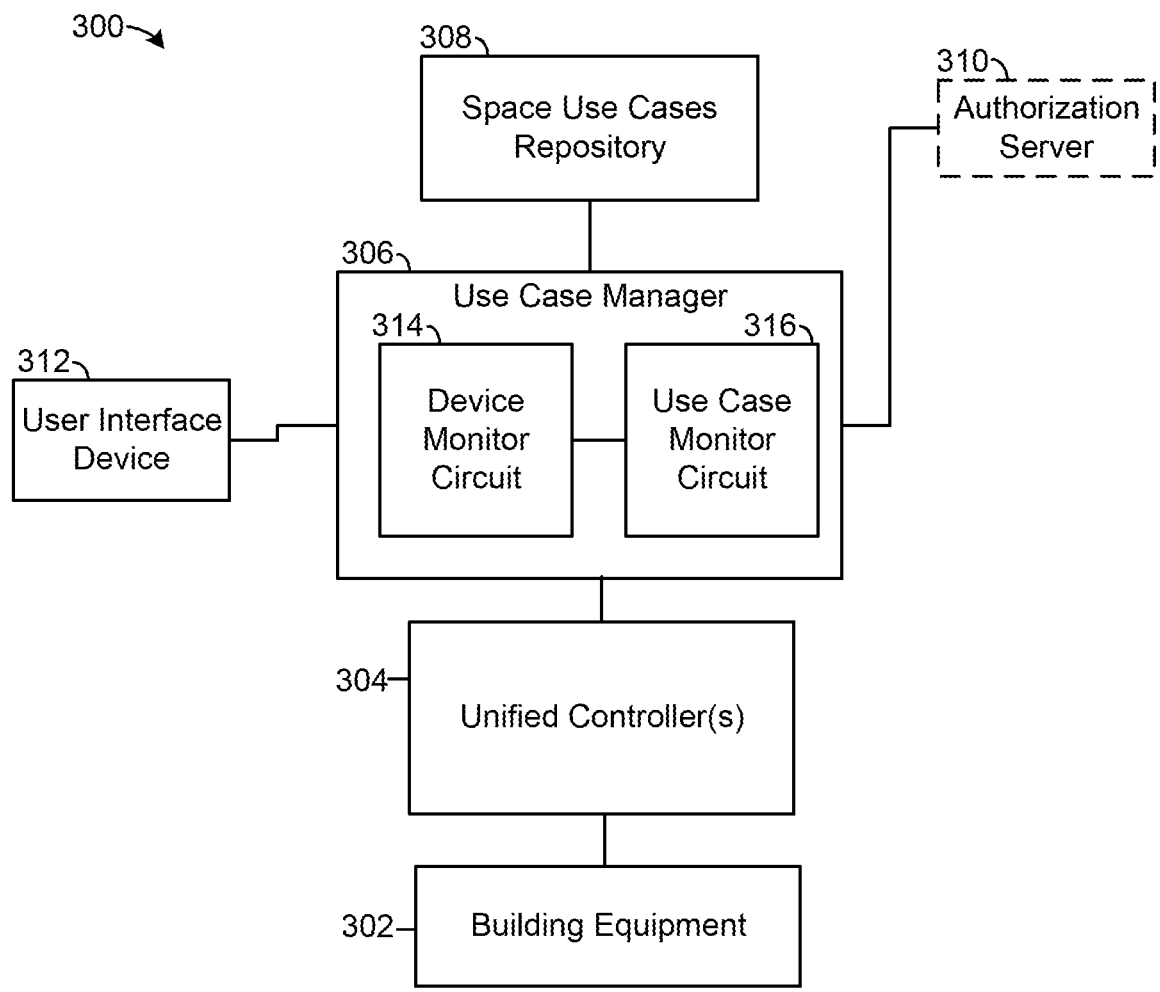
FIG. 3A is a block diagram of a system for facilitating modular expansion of a unified building management system, according to an exemplary embodiment.

Referring now to FIG. 3A, a block diagram of a system 300 for use with the UBMS 200 is shown, according to an exemplary embodiment. The system 300 may be implemented on various hardware elements of the UBMS 200, for example controllers, devices, equipment, cloud resources, enterprise servers, remote databases, networks, etc. It should be understood that although one example architecture is shown in FIG. 3A, the various functions attributed to the various elements of the system 300 may be executed by various combinations of computing resources, devices, equipment, controllers, etc. in various implementations.

As shown in FIG. 3A, the system 300 includes building equipment 302, unified controller(s) 304, use case manager 306, space use cases repository 308, authorization server 310, and user interface device 312.

In various embodiments, the building equipment 302 includes various devices traditionally associated with multiple building domains, for example HVAC devices, lighting devices, fire safety devices, access control devices, security devices, window shades, etc., including various sensors that collect data relating to the operation of the building equipment 302. The building equipment 302 may also include specialty systems such as nurse call systems, medical devices, presentation equipment (e.g., screens, projectors), and various other electronic devices suitable for use in various spaces and places. In other embodiments, remote data sources (e.g., a weather service) are also included in the system 100.

In the terminology used herein, building equipment 302 is said to be operational to serve a space when the building equipment 302 is installed, online in the UBMS such that the building equipment 302 can be controlled by the unified controller(s) 304 (i.e.)functional to operate as controlled by the unified controller(s) 304 and/or can collect data (e.g., sensor measurements) and provide the data to the unified controller(s) 304. Building equipment 302 operational to serve a space may include building equipment 302 located at or in the space (e.g., light fixtures, indoor air temperature sensors) as well as building equipment 302 located remote from the space and operable to affect the space or provide data relating to the space (e.g., chiller that serves a space, an outdoor air temperature sensor).

The unified controller(s) 304 may include one or more controllers configured to control the building equipment 302. The unified controller(s) 304 are configured to control devices across multiple building domains. For example, the unified controller(s) 304 can distribute settings to each of multiple devices of building equipment 302 to cause the building equipment 302 to operate in accordance with the settings. In the examples described herein, the unified controller(s) 304 control the building equipment 302 to operate in accordance with one or more space use cases.

The use case manager 306 is configured to determine which building domains and devices of building equipment are operational for a space and enable or disable space use cases for the space accordingly. In the example shown, the use case manager 306 includes a device monitor circuit 314 and a use case monitor circuit 316.

The device monitor circuit 314 is configured to identify the devices of building equipment 302 operational to serve a space. The device monitor circuit 314 ascertains a fully-qualified reference, network address, and/or other identifier for each device. The device monitor circuit 314 also determines a type of the device (i.e., determines whether the device is a chiller, boiler, light fixture, temperature sensor, etc.) and/or a domain associated with the device (e.g., HVAC, security, fire, lighting). In some embodiments, the devices push information to the device monitor circuit 314, for example alerting the device monitor circuit 314 of the presence of the device via a network and the type and/or domain of the device. In other embodiments, the device monitor circuit 314 is configured to search the network to detect the presence of devices of building equipment 302 and query or access the devices to determine the type and/or domain of each device.

Figure 3B:
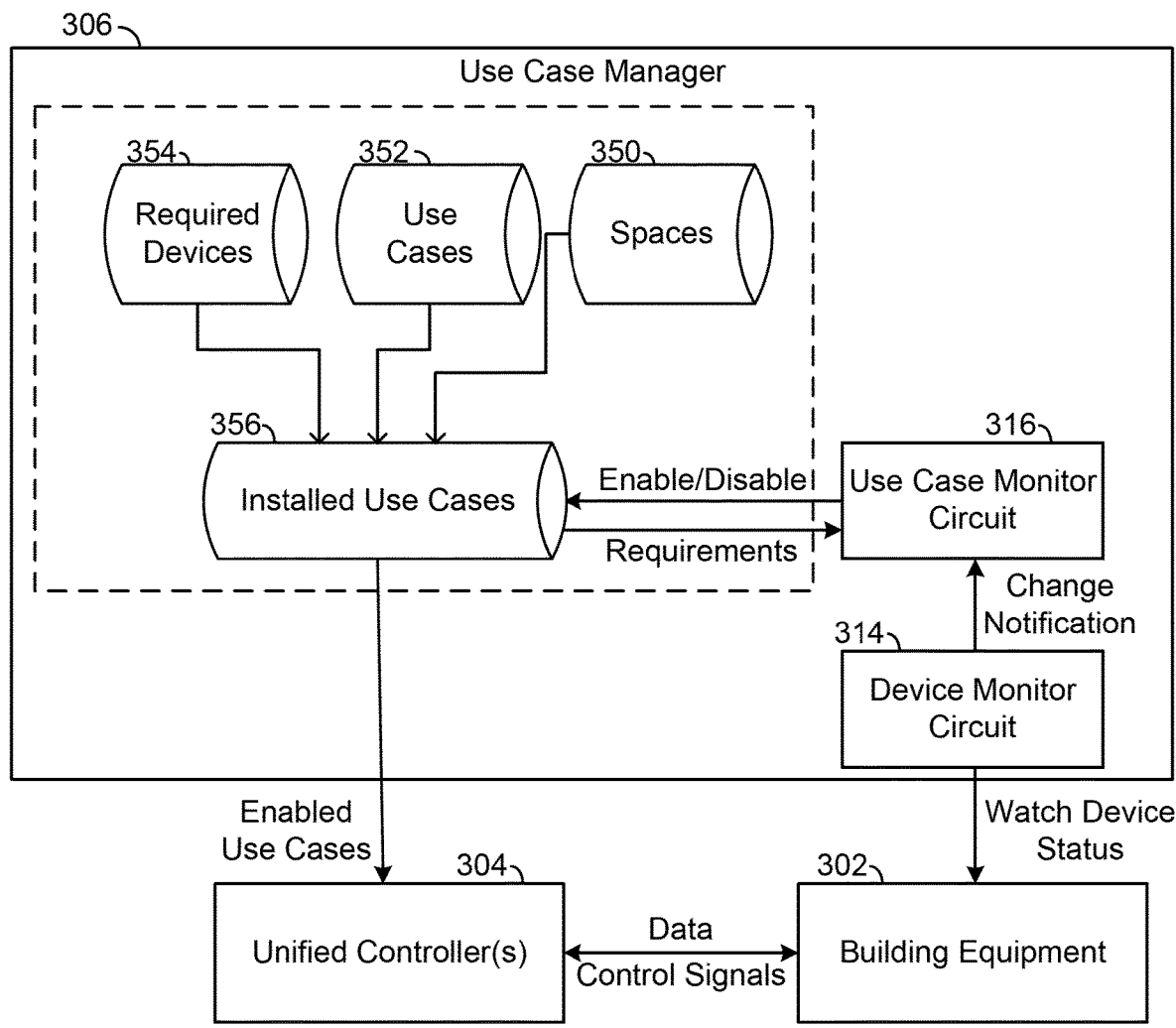
FIG. 3B is a first illustration depicting operation of the system of FIG. 3A, according to an exemplary embodiment.
Figure 3C:
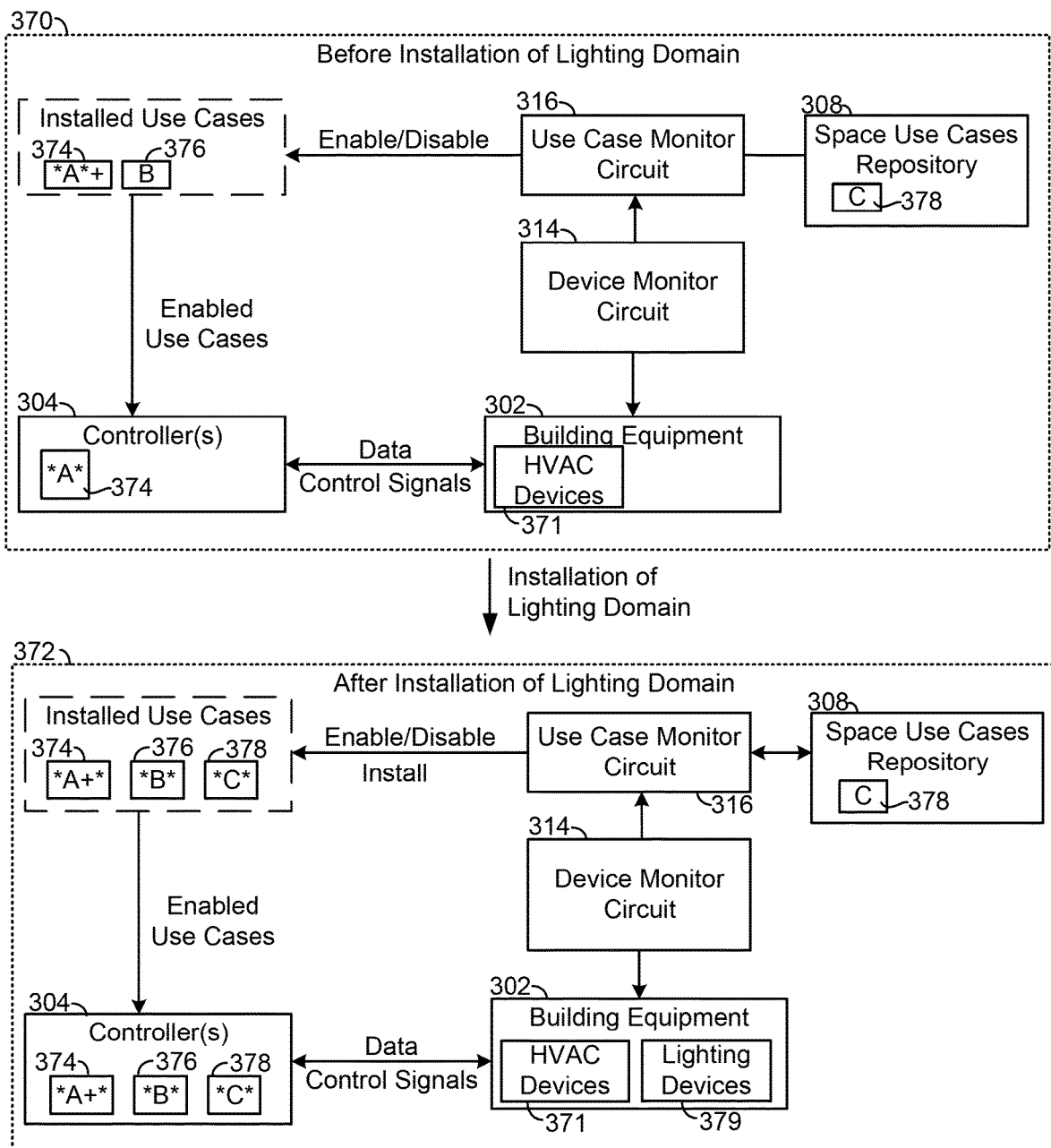
FIG. 3C is a second illustration depicting operation of the system of FIG. 3A in an exemplary scenario, according to an exemplary embodiment.

The device monitor circuit 314 is also configured to monitor the status of the various devices of building equipment 302. That is, the device monitor circuit 314 can determine which devices and/or domains of building equipment 302 are operational to serve a space. As shown in FIGS. 3B-C and described with reference thereto, the device monitor circuit 314 can monitor (watch, track, etc.) the status of various building equipment 302 and detect when a change occurs. Such a change may correspond to building equipment 302 going offline, experiencing a fault, or otherwise becoming non-operational. Such a change may also correspond to additional devices or domains of building equipment 302 becoming operational to serve the space.

The use case monitor circuit 316 is configured to enable space use cases for the space based on the devices of building equipment 302 operational at the space. In the embodiment shown, a space use cases repository 308 stores space use cases that can be enabled for the space. Each space use case may be associated with a set of device types and/or domains utilized by that space use case. Some devices types and/or domains may be indicated as required for a space use case, such that the space use case shall not be enabled unless a device of that type or domain is operational for the space.

The use case monitor circuit 316 is configured to identify space use cases that can be enabled for the space based on the device types and/or domains operational for the space. In some embodiments, the use case monitor circuit 316 selects a subset of such space use cases to enable based on a preferentiality of space use cases. For example, a first space use cases that facilitates a job at the space by utilizing three devices of building equipment 302 may be preferred over a second space use case that facilitates the same job but only uses two of the three devices of building equipment 302. In such a case, the use case monitor circuit 316 may enable (e.g., for each job or job step as defined below) the most preferred (e.g., the most robust, most accurate, most reliable) space use case for which all required device types and/or domains are operational for the space.

The use case monitor circuit 316 is configured to "enable" a space use case for use by the unified controller(s) 304 in controlling the building equipment 302. An enabled space use case is a space use case that is available to be activated for execution at the space. Based on information from the device monitor circuit 314, the use case monitor circuit 316 can enable a space use case by specifying network addresses, fully qualified references, etc. for the devices of building equipment 302 to be controlled to by the unified controller(s) 304 to provide the space use case at the space. For example, as described in detail below, the use case monitor circuit 316 can cause a destination field for a device type in a space use case profile to be populated with a network address, thereby configuring the unified controller 304 to communicate with the correct device to execute the space use case. The use case monitor circuit 316 may also cause a flag to be stored that marks a space use case as an enabled space use case.

In the example shown in FIG. 3A, the space use cases repository 308 is shown as separate from the unified controller(s) 304. In such a case, the use case monitor circuit 316 may copy control logic, settings, etc. for a space use case to be enabled from the space use cases repository 308 and install the control logic, settings, etc. on the unified controller(s) 304. In another example, the space use cases repository 308 is included with the unified controller(s) 304, such that space use cases are pre-installed on the unified controller(s) 304. In such a case, the use case monitor circuit 316 may facilitate the device monitor circuit 314 in automatically specifying network addresses, fully qualified references, etc. for the devices of building equipment 302 to be controlled to by the unified controller(s) 304 to provide the enabled space use cases. It should be understood that some combination of pre-installed and installable space use cases can be used in various embodiments.

In some cases, a space use case has various capabilities that may be enabled or disabled depending which particular types of devices are operational for a space, while the space use case as a whole may be enabled when a particular domain is operational for the space. Where reference is made herein to enabling or disabling a space use case, it should be understood that this may also include enabling or disabling particular capabilities, portions, or other sub-units of a space use case. Furthermore, enabling an additional capability of an enabled space use case is referred to as extending the space use case.

The use case manager 306 (i.e., the device monitor circuit 314 in coordination with the use case monitor circuit 316) may be operated at installation and/or start-up of the unified controller(s) 304 in order to enable a starting set of space use cases for a space. That is, all space use cases may be disabled by default, and enabled by the use case manager 306 as described above. In some cases, the use case manager 306 then operates continuously or periodically to determine new devices or domains that become operational for a space and enable new space use cases accordingly. In some cases, the use case manager 306 determines that a device or domain became non-operational for a space, for example due to a device failure or removal of the device by a user or technician. In such a case, the use case manager may disable space use cases for the space that require such a device and, in some cases, enable space use cases that do not require such a device. The use case manager 306 may enable or extend a space use case in response to a determination that a new device or domain became operational for a space. In some scenarios, the use case manager 306 may also disable a space use case in response to a determination that a new device or domain became operation for the space, for example if an added domain allows a more preferable space use case to be used. The space use cases that are enabled on the unified controller(s) 104 may thereby vary dynamically to track the set of devices and domains that are operation to serve the space.

As shown in FIG. 3A, the use case manager 306 can be communicable with an authorization server 310. The authorization server 310 is configured to manage the authorization of a space, UBMS, customer, etc. to access and enable particular space use cases or categories of space use cases. For example, in some embodiments, a customer may only be authorized to access a subset of the full set of space use cases stored by the space use cases repository 308, for example due to licensing restrictions, geographical restrictions, security restrictions, subscription levels, etc. The authorization server 310 may store a list of space use cases which the use case manager 306 is authorized to enable for a particular space or customer. In such a case, the use case manager 306 may interact with the authorization server 310 to determine whether the use case manager 306 has authorization to enable a particular space use case for a given space or customer. In response to a determination that the use case manager 306 has authorization to enable the particular space use case, the use case manager 306 enables the space use case. In response to a determination that the use case manager 306 does not have authorization to enable the particular space use case, the use case manager 306 does not enable the space use case and may select an alternative (authorized) space use case to enable to accomplish the same or similar function.

The system 300 of FIG. 3A is also shown to include a user interface device 312. The user interface device 312 may include a smartphone, tablet, laptop computer, desktop computer, thermostat display screen, device control panel, or some other device capable of providing information to a user and received input from a user. The user interface device 312 may be configured to provide a user with a graphical user interface that provides various information relating to the operation of the system 300 and receive various inputs from the user relating to the operation of the system 300. For example, the user interface device 312 may provide a graphical user interface that indicates what equipment is operational at a space and which space use cases are operational for the space. In some cases, the user interface device 312 may allow a user to input a request to enable or disable a particular space use case, adjust settings associated with a space use case or a device of building equipment 302, request a change in the list of space use cases authorized for that space or user at the authorization server, or otherwise adjust the operation of the unified controller(s) 304 and/or the building equipment 302. In some cases, the user interface device 312 may allow a user to input an indication that an additional building domain has been added to serve a space and request to activate the additional building domain for the space. In response, the equipment identification circuit may identify new equipment added with the additional building domain and the use case enablement circuit may enable space use cases that utilize such devices.

Referring now to FIGS. 3B-C, illustrations depicting operation of the system 300 of FIG. 3A are shown, according to exemplary embodiments.

FIG. 3B illustrates the ability of use case manager 306 (i.e., the device monitor circuit 314 in coordination with the use case monitor circuit 316) to monitor device status and dynamically enable and disable space use cases in response to changes in the status of building equipment 302. As shown in FIG. 3B, the use case manager 306 utilizes various information relating to the space use cases. First, space information 350 defines the relationship between various spaces in a place and provides information relating to a type of each space. For example, the space information 350 may indicate that a space is identified as a conference room, a hallway, a restroom, an office, a patient room, an operating room, etc. Second, use cases information 352 defines various aspects of each space use case, as described elsewhere herein. For example the space use case information 352 may include code or pseudocode for managing and executing a space use case, for example as in the example of FIG. 10. In some embodiments, the space use cases information 352 can relate to any possible use case, including installed space use cases, non-installed space use case (e.g., use cases available in the space use case repository 308), enabled space use cases, disabled space use cases, etc. Third, required devices information 354 defines a set of required devices for each space use case. Each space use case may be associated with a set of domains and/or devices that are required for proper execution (operation, implementation, etc.) of the space use case. The required device information 354 facilitates the use case manager 306 in ensuring that the required devices for a space use case are operational for a space for all enabled space use cases. In the illustration of FIG. 3B, the spaces information 350, the use cases information 352, and the required devices information 354 are collected in an installed use cases database 356 of the use case manager 306.

As illustrated in FIG. 3B, the device monitor circuit 314 watches (monitors) the building equipment 302 and determines the status of the devices of building equipment 302, for example whether a particular device is operational or non-operational. The device monitor circuit 314 is configured to detect a change the status of a device of building equipment 302 (e.g., from operational to non-operational or vice versa). In response to detecting a change in the status of the device, the device monitor circuit 314 provides a change notification to the use case monitor circuit 316. The change notification includes an indication of the device, the domain of the device, and the updated status of the device.

The user case monitor circuit 316 is configured to receive the change notification from the device monitor circuit 314 and to receive one or more sets of space use case requirements from the installed use cases database 356. For example, each space use case may be associated with a set of required domains and/or a set of required devices for the space use case, and the use case monitor circuit 316 can be configured to obtain information defining the sets.

The use case monitor circuit 316 is configured to compare the change notification to the set of required domains and/or devices for each space use case. For an enabled space use case, the use case monitor circuit 316 checks whether the change notification indicates that a required domain or device for the particular space use has become non-operational for the space. If the requirements are no longer met, the use case monitor circuit 316 disables the space use case. For non-enabled space use cases, the use case monitor circuit 316 checks whether, following the status change indicated by the change notification, all domains and/or devices in the set of required domains and/or devices for the space use case are operational. If all requirements are met for a space use case, the use case monitor circuit 316 enables the space use case.

Additionally, if the change notification indicates that an additional device of building equipment 302 has become operational for the space, the use case monitor circuit 316 can determine that one or more space use cases can be extended to involve the additional device and can extend such space use cases accordingly. For example, in such a scenario, the additional device may not be required for execution of a space use case but the space use case can be improved by involving the additional device (e.g., by processing data from the additional device, by controlling the additional device, etc.). The use case monitor circuit 316 can extend the space use case by updating the space use case to involve the additional device in execution of the space use case. In some cases, extending the space use case includes enabling a previously-dormant portion of the space use case. In some cases, extending the space use case also includes altering the settings, logic, applications, etc. for existing devices in the space use case to adjust for the addition of the additional device.

Figure 6:
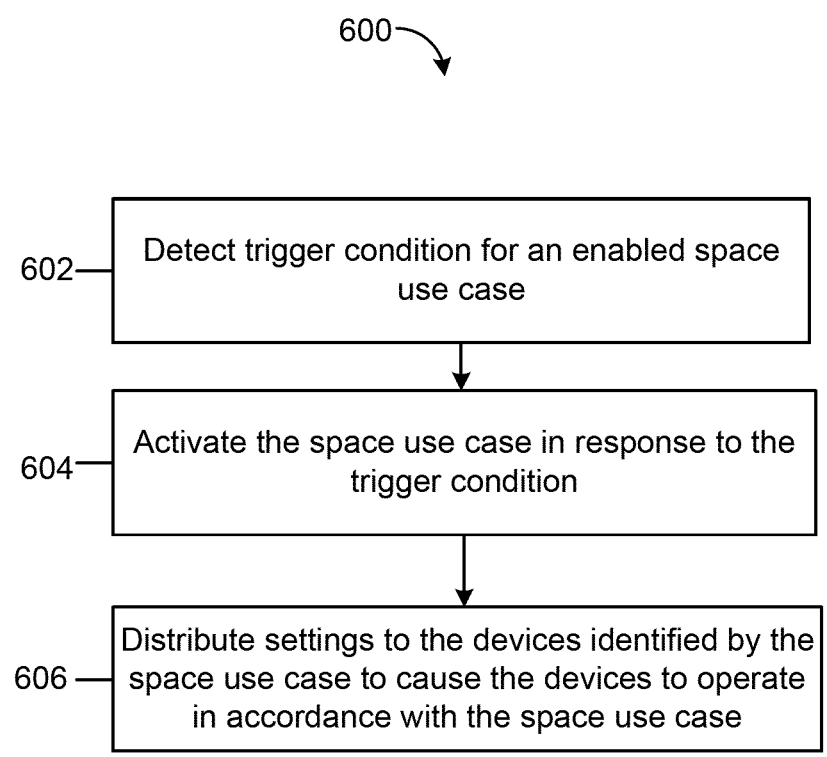
FIG. 6 is a flowchart of a process of online control in a unified building management system based on the space use cases enabled in the processes of FIGS. 4 and 5, according to an exemplary embodiment.

The unified controller(s) 304 obtain the enabled space use cases and control the building equipment 302 in accordance with the enabled space use cases. For example, as shown in FIG. 3B, the unified controller(s) 304 may receive various data from the building equipment 302. As shown in FIG. 6 and described with reference thereto, the unified controller(s) 304 can determine the occurrence of a trigger condition associated with an enabled space use case, and, in response, activate the space use case. The unified controller(s) 304 then generate control signals based on the activated space use case and, in some cases, the data from the building equipment 302 and provide the control signals to the building equipment 302 to control the building equipment 302.

FIG. 3B thereby illustrates that the system 300 provides for dynamic updates to the space use cases that are enabled for a space based on the devices and/or domains of building equipment 302 which are available to serve the space.

Referring now to FIG. 3C, an illustration depicting the installation of an additional domain of building equipment 302 and the corresponding adjustment to space use cases for the space is shown, according to an exemplary embodiment. FIG. 3C shows an example process using the functionality described with reference to FIGS. 3A-B, in which the lighting domain is added to the system 300. In particular, a first frame 370 shows the system 300 before addition of the lighting domain and a second frame 372 shows the system 372 after addition of the lighting domain.

In the first frame 370 of FIG. 3C, the building equipment 302 includes only HVAC devices 371. In the first frame 370, the installed use cases include space use case "A+" 374 and space use case "B" 376. In the notation of FIG. 3C, the symbols * indicate an enabled space use cases. In the first frame 370, space use case B 376 is shown as non-enabled, because, in this example, space use case B 376 requires the lighting domain to be operational at the space. Additionally, a portion of the space use case A 374 (indicated by *A*) is shown as enabled, while an additional capability indicated by the + symbol is not enabled. In this example, space use case A 374 requires the HVAC devices 371 while optional capabilities indicated by the + symbol utilize the lighting domain. The controller 304 is shown as operating to control the building equipment in accordance with the enabled space use case A 374. A space use case "C" 378 is shown as stored in the space use cases repository 308.

In the second frame 372 of FIG. 3C, lighting devices 379 have been installed in the space and included with the building equipment 302. That is, the lighting devices 378 have been activated for control by the controllers 304 and placed in communication with the device monitor circuit 314. In installing and configuring the lighting devices 379, various space configuration information, networking information, and other common data model elements may be reused from the existing configuration of the HVAC devices 371 to facilitate user-friendly configuration of the lighting devices 378. When the lighting devices 379 are installed and become operational to serve the space, the device monitor circuit 314 determines a change in the devices operation for the space and provides a change notification to the use case monitor circuit 316 as described above.

In response to the lighting domain becoming operational, the use case monitor 316 extends the space use case A 374 to be fully enabled as space use case A+ 374. Space use case A+ 374 then utilizes both the HVAC devices 371 and the lighting devices 378, which may be an improvement over using the HVAC devices 371 without the lighting devices 379. The device monitor circuit 314 also determines that the required domain for the space use case B (i.e., the lighting domain) is now operational and, in response, causes the use case monitor circuit 316 to enable space use case B 376. Additionally, in the example shown, the use case monitor 316 determines that space use case C 378 can be installed and enabled in response to addition of the lighting domain (as indicated by the device monitor circuit 314). The use case monitor 316 obtains space use case C 378 and installs and enables space use case C 378 for use by the controller(s) 304. Accordingly, FIG. 3C shows the controller(s) as configured to control the building equipment 302 to operate in accordance with space use case A+ 374, space use case B 376, and space use case C 378.

FIG. 3C thereby illustrates enablement of space use cases to automatically adjust for an additional domain (here, the lighting domain) becoming operational to serve a space. It should be understood that space use cases can also be disable, for example to move from the second frame 372 to the first frame 370 in the event that the lighting devices 379 are disconnected, broken, or otherwise cease to be operational.

Figure 4:
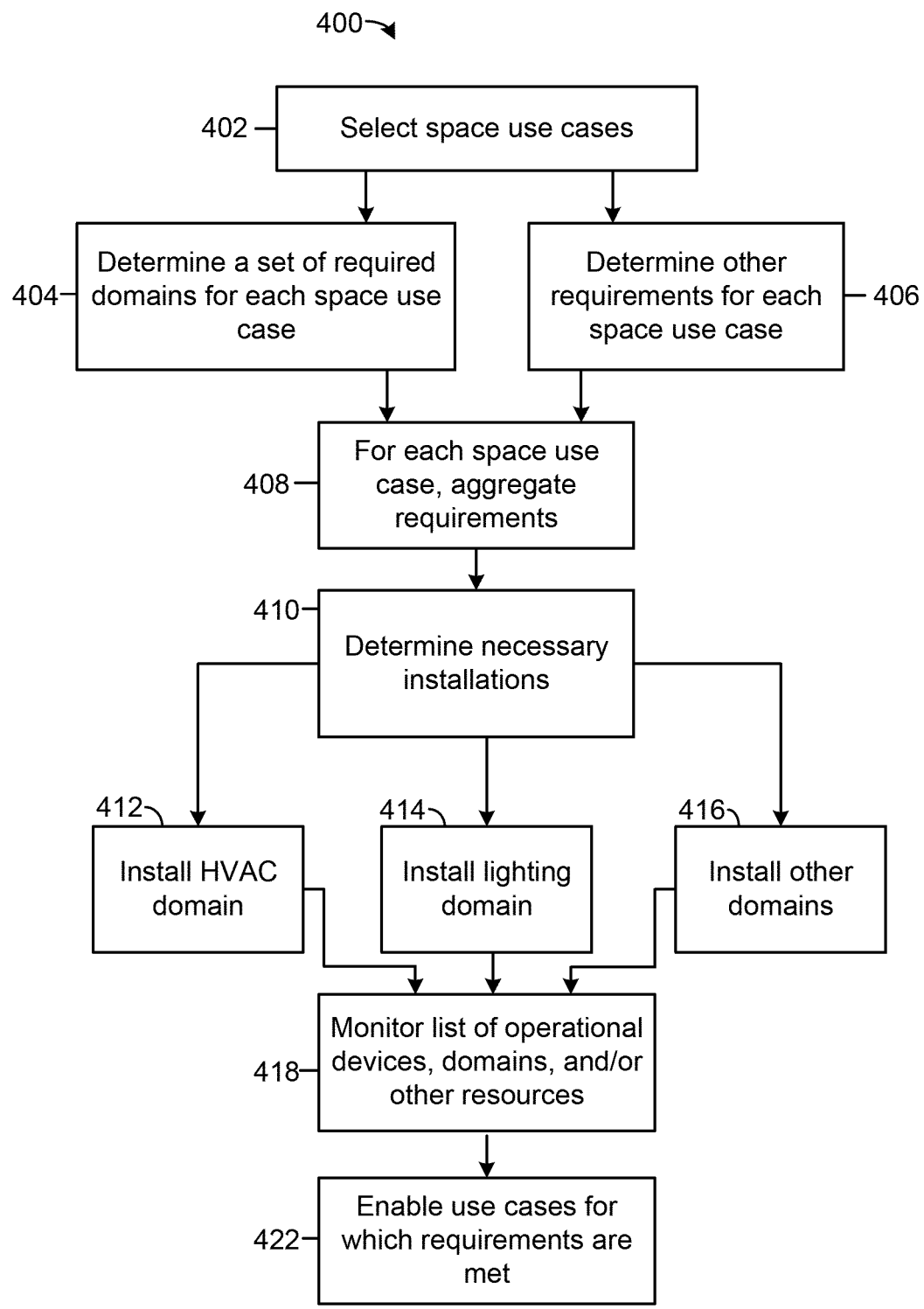
FIG. 4 is a flowchart of a first process for enabling and disabling space use cases or portions thereof, according to an exemplary embodiment.

Referring now to FIG. 4, a flowchart of a process 400 for enabling space use cases is shown, according to an exemplary embodiment. In particular, the process 400 corresponds to new construction or other scenario in which a new UBMS 200 is installed at a space or place. The process 400 may be executed by the system 300 of FIG. 3A-C to enable and disable space use cases in a UBMS 200. It should be understood that various other systems with various system architectures may be used to execute the process 400 in various embodiments.

Figure 8:
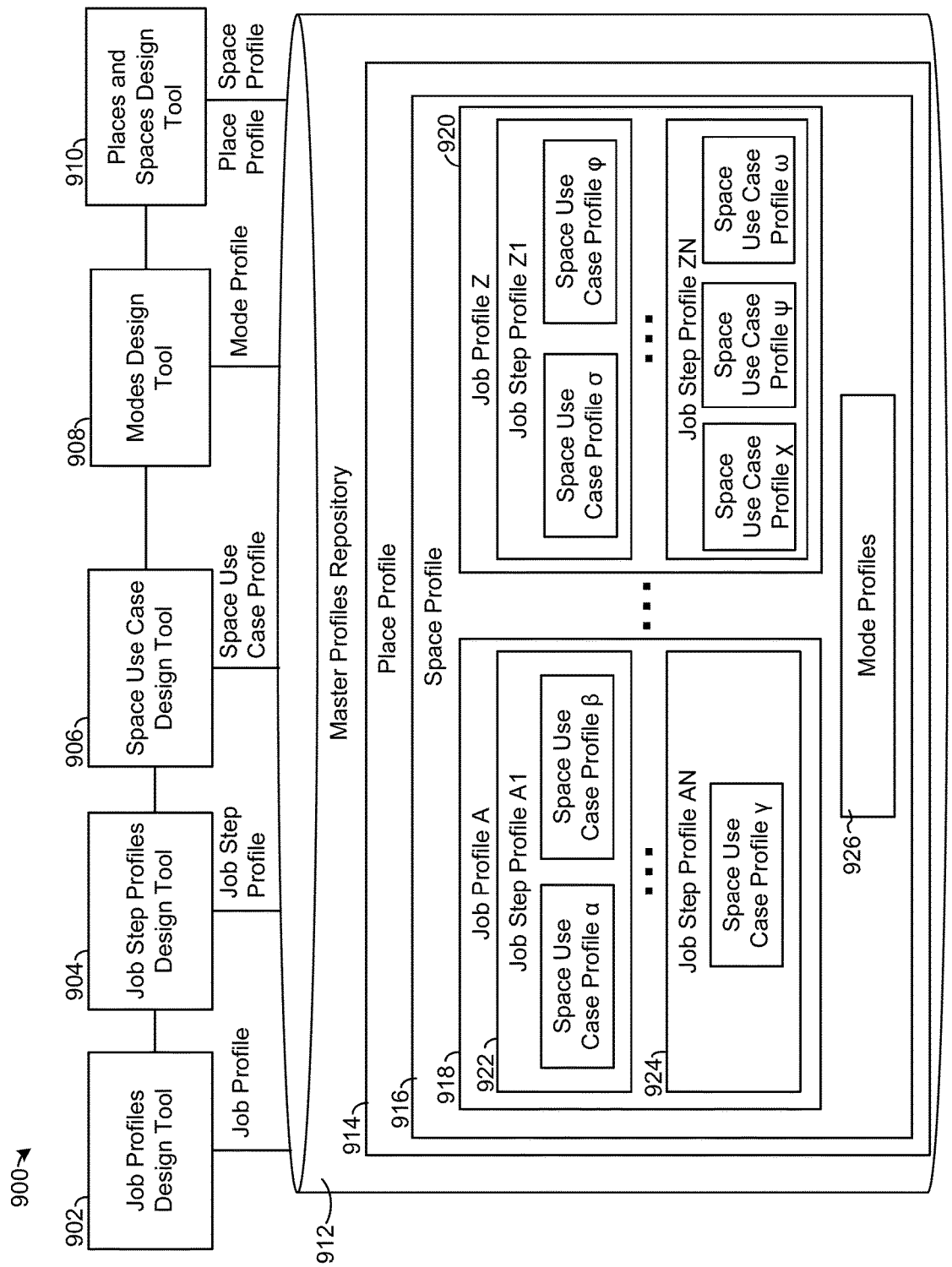
FIG. 8 is a block diagram of a system for creating and storing job profiles, job step profiles, space use case profiles, mode profiles, space profiles, and place profiles, according to an exemplary embodiment.
Figure 9:
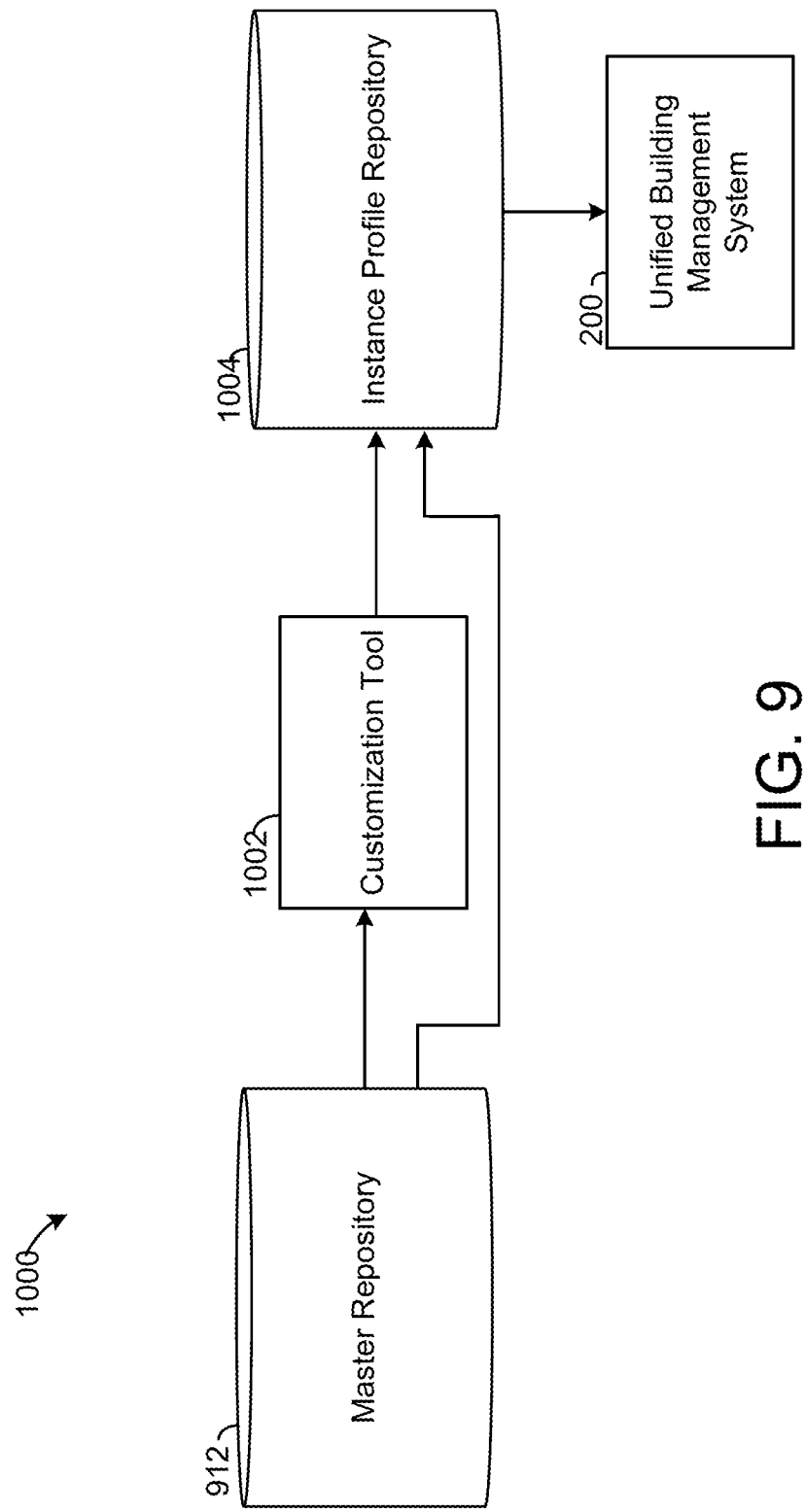
FIG. 9 is a block diagram of a system for customizing profiles created and stored in the system of FIG. 1 for application in particular places and spaces and/or to meet the requirements of a particular customer, according to an exemplary embodiment.

At step 402, space use cases for the space are selected such that a set of space use cases for the space is determined. In some embodiments, the space use cases are selected by selecting a space profile for the space, for example as shown in FIGS. 8-9 and described with reference thereto. In some embodiments, space use cases for the space are selected by a user via a graphical user interface (e.g., via user interface device 312).

At step 404, a set of required building domains for each space use case is determined, for example by the use case manager 306. The set of required building domains for a space use case consists of the building domains which are required for successful execution of the space use case. The set of required building domains may be defined by a space use case profile or determined based on a space use case profile, for example as described with reference to FIG. 10 below.

At step 406, other requirements for each space use case is determined, for example by the use case manager 306. For example, a space use case may require electronic communication with a remote data source, for example a weather service. As another example, a space use case may require a minimum available bandwidth for network communications (e.g., for video streaming). As another example, a space use case may require a particular type of device within a required domain identified at step 404. Various requirements are possible. Requirements can be defined by a space use case profile for each space use case.

At step 408, the requirements for each space use case are aggregated, for example by the use case manager 306. That is, the set of required building domains from step 406 and the other requirements from step 406 are collected to generate a single set of requirements for each space use case.

At step 410, installations necessary to satisfy the requirements are determined. As mentioned above, the process 400 corresponds to a new construction scenario. Accordingly, various configurations, drivers, network routing, logic, profiles, etc. for various domains and devices have not yet been installed. At step 410, the various software that needs to be installed to satisfying the requirements of the selected space use cases is determined. In the example shown, the space use case manager 306 determines that installation is required for the HVAC domain, the lighting domain, and various other domains and devices.

At step 412, the HVAC domain is installed. At step 414, the lighting domain is installed. At step 416, other domains are installed. In some cases, installing the HVAC domain, the lighting domain, and/or the other domains may include physical installation of devices of building equipment (e.g., positioning devices in a space). In some cases, installing the HVAC domain, the lighting domain, and/or the other domains may include configuring software for the devices, including on controllers for the devices (e.g., controllers 304), in a network switch of the UBMS 200, or at the use case manager 306. Various installation steps may be required in various implementations and for various domains and devices. Following installation, installed domains become operational to serve the space.

At step 418, a list of operational devices, domains, and/or other resources is monitored, for example by the device monitor circuit 314. That is, the devices, domains, and/or other resources which are operational to serve the space may be ascertained and compiled into a list. The list is updated as devices, domains, and/or other resources become operational and/or cease to be operational (either permanently or temporally). A current or near-current list of operational device domains and/or other resources can thereby be maintained. For example, the list may be updated every second, every minute, every fifteen minutes, every hour, every day, etc., or in response to an event, condition, user input, etc.

At step 422, a space use case for which the requirements are met are enabled. For example, the list of operational devices, domains, and/or other resources maintained at step 418 can be compared to the requirements aggregated at step 408. For each space use case, if all requirements are included as operational on the list of operational devices, domains, and/or other resources, the space use case is then enabled. In some embodiments, enabling a space use case may include populating destination fields of a space use case profile to configure the space use case profile to control the devices and/or communicate with other resources. The space use cases selected at step 402 for which all required domains, devices, and other requirements were installed or otherwise satisfied are thereby enabled. After initial installation and enablement, the set of enabled space use cases can be dynamically updated as shown in FIG. 5 and described with reference to process 500 below.

Figure 5:
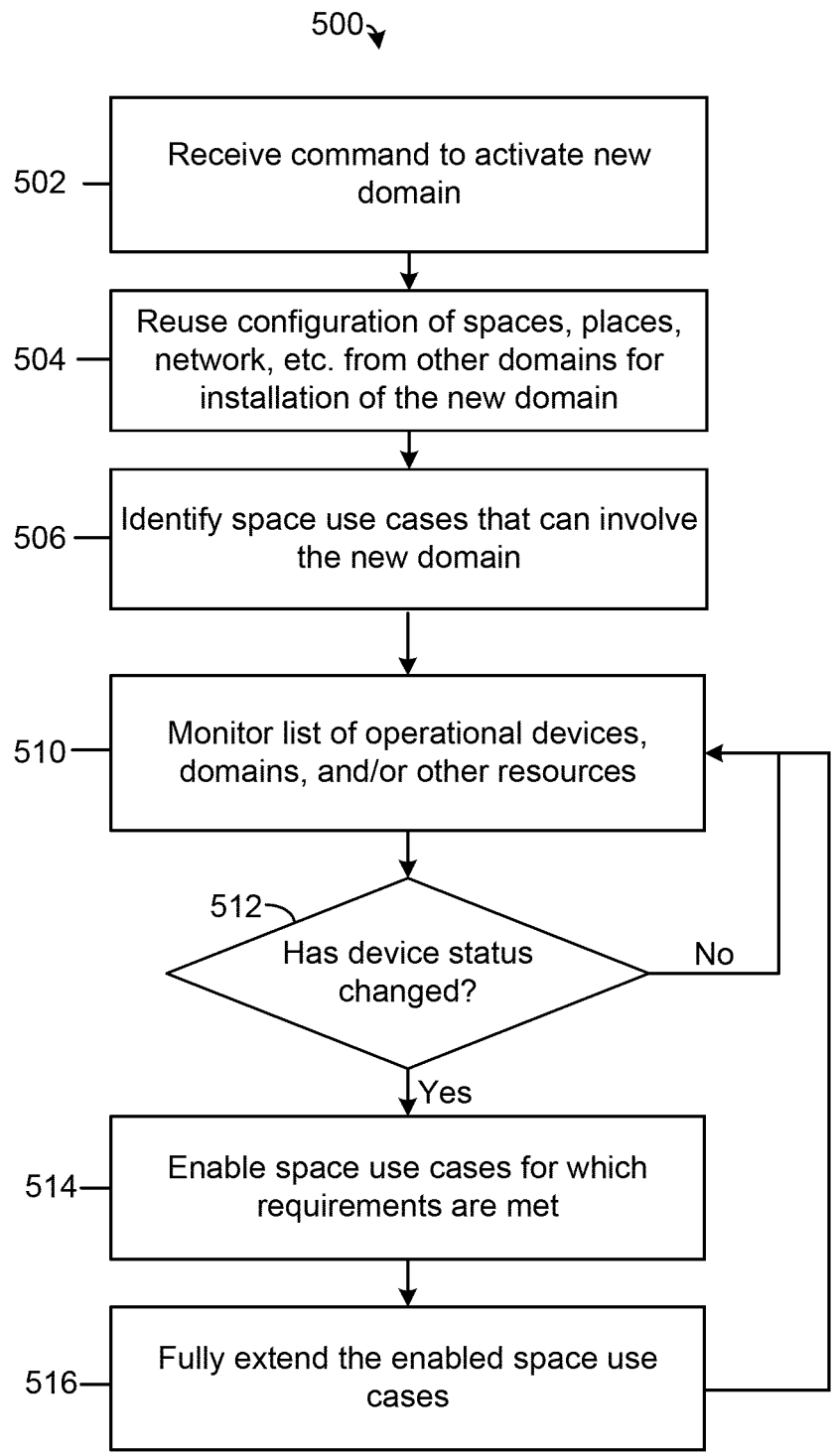
FIG. 5 is a flowchart of a second process for enabling and disabling space use cases or portions thereof, according to an exemplary embodiment.

Referring now to FIG. 5, a process 500 for enabling and disabling space use cases is shown, according to an exemplary embodiment. Process 500 corresponds to a scenario which a new domain is added to the UBMS, for example a retrofit scenario, i.e., a scenario for which one or more space use cases are already enabled and one or more domains are already operational for a space at the initiation of process 500. The process 500 may be executed by the system 300 of FIG. 3A-C to enable and disable space use cases in a UBMS 200. It should be understood that various other systems with various system architectures may be used to execute the process 500 in various embodiments.

At step 502, a command is received to activate a new domain, for example by the use case manager 306 (e.g., by the device monitor circuit 314 of the use case manager 306). For example, devices from an additional domain (e.g., a domain that is not already operational at the space) may be physically installed at a space and connected to a network in communication with the use case manager 306. In some cases, the device monitor circuit 314 automatically detects the presence of the added devices to receive the command. In some cases, the device monitor circuit 314 receives the command to activate the new domain from a user (e.g., via the user interface device 312).

At step 504, the new domain is installed by reusing the existing configuration of spaces, places, network addresses, etc. that is in use by the already-operational domains. The new domain can be installed in a plug-and-play manner facilitated by a common data model and the pre-existing configurations.

At step 506, space use cases that can involve the new domain are identified, for example by the use case manager 306. A space use case involves a domain if it utilizes data from one or more devices the domain, includes controlling one or more devices of the domain, or otherwise includes operation of one or more devices of the domain. The space use cases identified at step 506 can include enabled space use cases which can be extended to involve the new domain. The space use cases identified at step 506 can also include non-enabled space use cases which require the new domain. In some cases, the identified space use cases may be pre-installed on a controller. In some cases, one or more of the identified space use cases may be stored in a remote database (e.g., space use case repository 308). In such a case, the identified space use cases can be downloaded and installed at step 506. Step 506 may also include determining requirements of the identified space use cases.

At step 510, a list of operational devices, domains, and/or other resources is monitored for example by the device monitor circuit 314. That is, the devices, domains, and/or other resources which are operational to serve the space may be ascertained and compiled into a list. The list is updated as devices, domains, and/or other resources become operational and/or cease to be operational (either permanently or temporally). A current or near-current list of operational device domains and/or other resources can thereby be maintained. For example, the list may be updated every second, every minute, every fifteen minutes, every hour, every day, etc., or in response to an event, condition, user input, etc.

At step 512, a determination is made regarding whether the operational status of a device, domain, and/or other resource changed when the list of operational devices, domains, and/or other resources is updated during step 510. For example, when the new domain is activated, additional operational devices, domains, and/or other resources will be included on an updated list of operational devices, domains, and/or other resources. Such changes are determined at step 512.

If no change is detected at step 512, the process returns to step 510 where the list of operational devices, domains, and/or other resources continues to be monitored. If a change is detected at step 512 (as is the case following activation of the new domain in steps 502-504), the process 500 proceeds to step 514 where spaces use cases for which the requirements are met are enabled. Step 514 can include enabling space use cases for which the new domain is included in a set of required domains for the space use case. Step 514 can also include enabling or disabling other space use cases for which a change occurred to required domains, devices, or resources.

At step 516, the enabled space use cases are fully extended to involve the operational devices, domains, and/or other resources. In some cases, fully extending an enabled space use case includes extending the space use case to involve all operational devices, domains, and/or other resources that can be involved in the space use case. In other cases, fully extending an enabled space use case includes determining a subset of the all operational devices, domains, and/or other resources that provides a best (e.g., preferred, most accurate, most efficient, etc.) version of the space use case and extending the space use case to involve that subset of devices, domains, and/or other resources. Step 516 may include optimizing the utilization of the various operational devices, domains, and/or other resources to provide optimal execution of the enabled space use cases. It should be understood that step 516 can include increasing or reducing the number of devices, domains, and/or other resources involved in a space us case.

The process 500 then returns to step 510, where a list of operational devices, domains, and/or other resources is monitored, and to step 512, where changes in the list are detected. By repeating steps 510-516, the process 500 provides for online dynamic updates to the space use cases enabled at the space.

Referring now to FIG. 6, a flowchart of a process 600 showing online control in a UBMS using space use cases is shown, according to an exemplary embodiment.

At step 602, a an occurrence of a trigger condition is detected. For example, in the embodiment of FIG. 3A, unified controller(s) 304 can receive sensor data from building equipment 302 and compare the data to trigger conditions associated with the enabled space use cases to determine if a trigger condition is satisfied. As another example, a trigger condition may be defined by a user inputting a command to the unified controller(s) 304 via user interface device 312.

At step 604, a space use case is activated based on the trigger condition. A space use case may be activated when a trigger condition associated with that space use case occurs. In some embodiments, space use cases are assigned a priority, such that when trigger condition for two or more space use cases occur simultaneously, the priority can be used to select which space use case to activate. Priority of space use cases can be defined or determined based on various factors in various embodiments, including identity of a user associated with the space use case, an effect of the space use case, a pre-defined priority level of the space use case, a characteristic of the trigger condition, etc.

At step 606, in the example shown, settings are distributed to the operational devices to cause the operational devices to operate in accordance with the active space use case. That is, the devices operate based on the settings to provide the space use case at the space. Various other logic, applications, etc. may also be distributed to provide the space use case. In some embodiments, control of building equipment 302 is based on mode-based control described in detail in U.S. patent application Ser. No. 16/186,230, filed Nov. 9, 2018, incorporated by reference herein in its entirety. The framework described herein thereby provides for online control of building equipment 302.

Referring generally to FIGS. 4-6, it should be understood that the various steps may be rearranged, omitted, repeated, etc. in various embodiments. In other words, the present disclosure contemplates various combinations, orderings, processes, workflows, implementations, etc. of the frameworks, process steps, and concepts described herein.

Figure 7:
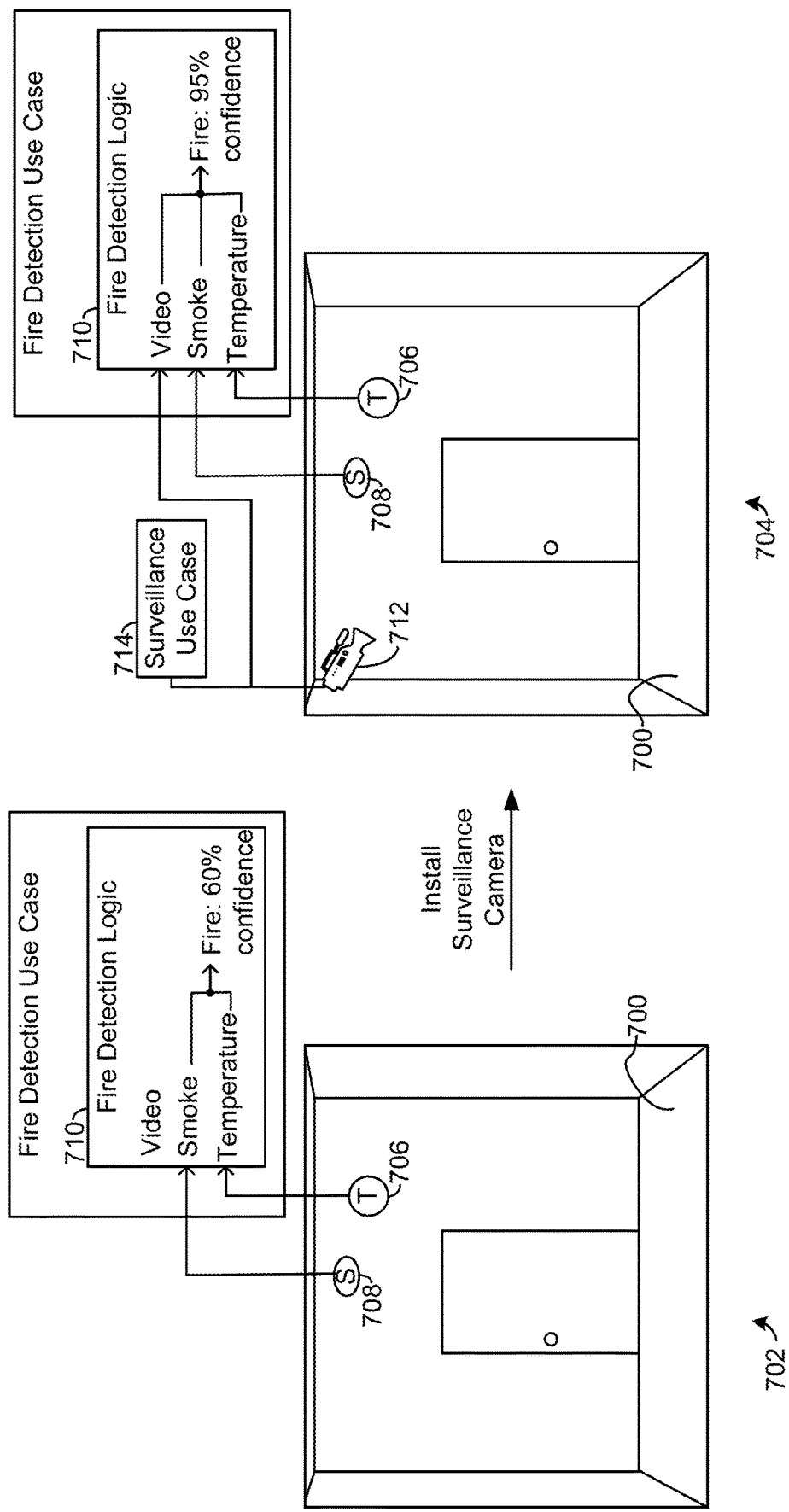
FIG. 7 is an illustration of an example of modular expansion in a unified building management system, according to an exemplary embodiment.

Referring now to FIG. 7, an example of modular expansion of the UBMS 200 is shown, according to an exemplary embodiment. FIG. 7 shows a space 700 in a before view 702 and an after view 704. In the before view 702, the room 700 is served by a temperature sensor 706 and a smoke detector 708. The temperature sensor 706 is configured to measure the indoor air temperature in the space 700. The temperature sensor 706 provides temperature measurements to fire detection logic 710, which is executed as part of a fire detection use case for the space. The smoke detector 708 is configured to detect the presence or absence of smoke in the space 700. The smoke detector 708 provides an indication of the presence or absences of smoke to the fire detection logic 710. The fire detection logic 710 may be operated on one or more of many possible computing devices in the UBMS 200.

As shown in the before view 702, the fire detection logic 710 of the fire detection use case is configured to determine whether or not a fire is burning in the space 700 based on the temperature measurements from the temperature sensor 706 and the indication from the smoke detector 708. Using these two data points, in this example the fire detection logic 710 only has 60% confidence in a determination that fire is or is not burning in the space 700. The fire use case is also shown to include the dormant capability to receive video and use the video to determine whether or not a fire is or is not burning in the space 700, for example to improve the confidence percentage of the determination.

The transition from the before view 702 to the after view 704 corresponds to the installation of a surveillance camera 712 for the space 700 and activation of a surveillance domain. For example, a building owner may decide to install a surveillance camera 712 for the space 700 primarily for the purpose of increasing building security. The surveillance camera 712 is configured to record video of the space 700. When the surveillance camera 712 and the surveillance domain are activated (e.g., as in process 600 of FIG. 6), a surveillance use case 714 is enabled. As shown in FIG. 7, the surveillance camera 712 provides the video to surveillance use case 714. The surveillance use case 714 facilitates surveillance of the space 700.

Additionally, as shown in FIG. 7, the fire detection use case has been extended to involve the surveillance camera 712. The surveillance camera 712 is shown as providing video to the fire detection logic 710. To extend the fire detection use case when the surveillance camera 712 is added, a dormant capability of the fire detection logic 710 to use video to improve confidence in determinations relating to fire in the space 700 is automatically activated. Accordingly, in the after view 704, the fire detection logic 710 is shown as determining whether a fire is burning in the space 700 with a 95% confidence based on the smoke indication from the smoke detector 708, temperature measurements from the temperature sensor 706, and video from the surveillance camera 712. The addition of the surveillance camera 712 thereby improves the pre-existing (and already enabled) fire detection space use case. This may occur automatically, even if a technician or owner who installs the surveillance camera 712 is unaware of the capability of the fire detection space use case to be improved by the availability of video from the surveillance camera 712.

In some embodiments, extension of the fire detection use case to involve the surveillance domain (i.e., to involve the surveillance camera 712) improves a response of devices of the fire domain to a detected fire. For example, the fire detection use case may include an application configured to use the video feed from the surveillance camera 712 to determine a location (position, area, etc.) of a fire within the space 700. This location determination may be used as a control input for a fire suppression system (e.g., sprinkler system) in order to direct fire suppressants (e.g., foam, water) to the location of the fire while reducing or eliminating exposure of other areas of the space 700 to the fire suppressants. This may result in improved fire suppression and reduced damage to the space 700 caused as a side-effect of the fire suppressant.

Referring now to FIGS. 8-10, an example embodiment of the UBMS 200 implemented within a framework that facilitates design and operation of building systems based on jobs that people undertake in spaces and places is shown and described. The systems shown in FIGS. 8-10 rely on a unique framework which conceptualizes the design and operation of building systems for spaces and places based on jobs, job steps, use cases, and space use cases, each of which is defined below. As described in detail below, this framework may be applied in applications, tools, systems, apparatuses, and methods that facilitate the design and operation of building systems.

A space is a sub-unit of a place, for example a room or floor of a building. For the sake of brevity and clarity, a place may be considered to be a space (i.e., a space made up of spaces) as the term space is used herein. Accordingly, it should be understood that concepts, features, processes, etc. described herein with reference to spaces may also be applicable to places.

As used herein, a "job" refers to a goal or task that a person could work to accomplish. A job is solution agnostic, i.e., conceptually independent of the specific actions undertaken or the technologies used to complete the job. A job may be made up of a set of "job steps," which compose the job while remaining conceptually independent of the specific actions undertaken or the technologies used to complete each job step. Completing a job may require performance of multiple job steps in a particular order, in any order, or in some combination thereof In some cases, one job may be completed by accomplishing various combinations of various job steps. Jobs and job steps are therefore aligned with the way people understand and conceptualize the work and goals that people seek to accomplish in spaces and places without being limited by particular manual or technological implementations.

While jobs and job steps are solution-independent, the term "use case" as used herein refers to a solution-dependent action or set of actions to accomplish a job step. A use case may identify a particular technology (e.g., type of device, type of equipment) or set of technologies useable to accomplish a job step. A use case may also identify particular actions to be taken by automated technologies or by one or more people. A use case thereby describes an implementation of a job step. In many cases, multiple different use cases are possible for a single job step, reflecting the notion that a solution-independent job step may be accomplished in a variety of ways (i.e., by a variety of use cases). A use case may be applicable to various types of spaces (e.g., office, conference room, patient room, operating room, classroom, kitchen, restroom, etc.) for which a corresponding job step may be relevant.

A use case as applied to a space is a "space use case." Consistent with the description provided above, a space use case further defines a use case based on characteristics of the relevant space or type of space. A space use case unifies a use case around a variety of technologies, occupants, and purposes of the space, for example the devices of building equipment that may be commonly found in a type of space and specialty or business systems affecting the space, and/or the devices of building equipment actually operational to serve a particular space. Formulated in this space-centric way, a space use case is differentiated from traditional domain-centric frameworks that approach individual building domains separately. Space use cases thereby provide space-centric, unified definitions of how spaces may facilitate jobs and job steps. Space use cases bridge the gap between jobs and job steps—formulated in terms of human goals and objectives—and solutions unified around spaces to describe how spaces can support completion of job steps.

Together, jobs, job steps, use cases, and space use cases provide a framework that supports design and operation of building systems focused on what people seek to accomplish at a building while avoiding overwhelming low-level implementation details that have been the traditional focus of building design and operation. The framework may be applied in various design tools, data repositories, installation packages and tools, building management systems, online controllers, collections of building equipment, etc., as described in this application. For example, the framework may be well suited for application in a UBMS (e.g., UBMS 200) as described herein.

Advantageously, the framework and implementations based thereon provide a consistent specification for modeling space use cases, provide a unified execution environment for space use cases, allow flexibility in terms of how space use cases are developed, deployed, and executed (e.g., developed and instantiated in any order and at any time), and/or offload people from resolving conflicts that may arise from combining jobs, job steps, or use cases. Furthermore, a building management system based on the framework described herein may provide environments through the implantation of space use cases instead of individual domain use cases, for example shifting the focus from individual building domains or integrations of a few building domains to a controlling entity that can coordinate, resolve conflicts between, and execute space use cases across all building domains, business systems, and/or specialty systems relating to a space. The space may thereby be made more efficient and effective in facilitating jobs done in the space. Example embodiments of various implementations are shown in the FIGS. 8-10 and described in detail below.

Referring now to FIG. 8, a block diagram of a system 900 for creating and storing job profiles, job step profiles, space use case profiles, mode profiles, space profiles, and place profiles is shown, according to an exemplary embodiment. As used herein, the term "profile" refers to a data object that may contain various computer code, logic, data, attributes, files, etc. for characterizing various jobs, job steps, space use cases, modes, spaces, and places. A profile may include one or more other profiles. Profiles may be organized based on the use case framework described above. Accordingly, as described in detail below, the system 900 may be configured to provide for the creation and storage of job profiles, job step profiles, space use case profiles, mode profiles, space profiles, and place profiles.

The system 900 is shown to includes a job profiles design tool 902, a job step profiles design tool 904, a space use case design tool 906, a modes design tool 908, and a places and spaces design tool communicably coupled to a master profiles repository 912. It should be understood that the various design tools 902-910 are highly configurable. In some embodiments, the various design tools 902-910 may include various dedicated circuits, memory, processor(s), input/output devices, etc. operable to execute or facilitate the functions attributed thereto herein. In some embodiments, the various design tools 902-910 are provided as graphical user interfaces and/or graphical user interface components to a user on a user device (e.g., personal computer, smartphone, tablet, laptop), for example in an application or browser-based, internet-accessible format. For example, the various design tools 902-910 may be hosted and operated by a cloud server. Various other implementations are contemplated by the present disclosure.

The job profiles design tool 902 is configured to facilitate design, creation, and editing of job profiles, and the job step profiles design tool 904 facilitates design, creation, and editing of job step profiles (e.g., by a job designer). For example, the job profiles design tool 902 and the job step profiles design tool 904 may provide one or more graphical user interfaces that allow a user to input a design of a job or job step, respectively, and may generate a job profile and/or a job step profile based on the user input design.

A job profile characterizes a job that a person or people do at a space while a job step profile characterizes a job step to be done at a space. Job profiles and job step profiles provide the specification for space use case creation and execution. For example, job profiles and/or job step profiles may contain desired outcomes, target metrics, required environmental actions, impacted environmental conditions, priority of the job or job step, among other possible characteristics. A job profile that characterizes a job may contain one or more job step profiles that characterize job steps that make up the job. The job profile may specify a sequence of the job steps. A job step profile may include limits on environmental actions for the job step, a sequence of environmental actions for a job step, etc.

A job profile captures a solution agnostic specification of a job and may be used by any space use case that provides a solution for the job. Job profiles may be used both to facilitate system/building design by guiding creation of space use cases and for online run-time control to guide consistent execution of space use cases for the corresponding job. A job profile may define relationships with one or more related and/or dependent jobs. As described in further detail below, a job profile may be part of a space profile, including master space profiles and instance space profiles. Job profiles may be created, edited, updated, removed, added, etc. without intervention from expert users or software developers.

A job step profile captures a solution agnostic specification of a job step and may be used by any space use case that provides a solution for the job step. Job step profiles may be used both to facilitate system/building design guiding creation of space use cases and for online run-time control to guide consistent execution of space use cases for the corresponding job step. A job step profile may contain one or more space use cases that may be used to complete the job step.

The space use case design tool 906 is configured to facilitate design, creation, and editing of space use cases (e.g., by a space use case designer). For example, the space use case design tool 906 may provide one or more graphical user interfaces that allow a user to input a design of a space use case and may generate a space use case profile based on the user input design. This tool may hide complexity of domain-specific operations such that designers/creators/managers/etc. of the space use cases do not need deep domain-specific knowledge. For example, such designer need not be a Controls Specialist, Fire Technician, Security Technician, IT Analyst, Master Integrator, etc. in order to design/create/manage space use cases.

A space use case profile characterizes a space use case and may facilitate the seamless execution of a job or job step across all building domains, business systems, and specialty systems for a space. Space use case profiles may unify use case solutions around the space to enable coordination, conflict resolution, and execution for the space. Space use case profiles hide complexity of domain-specific operations so that users (e.g., designers, creators, managers) of space use case profiles do not need deep domain-specific knowledge. In some embodiments, space use case profiles may have an open framework (e.g., open data model, open software, software development kit, etc.) that allows third parties to create space use cases. Space use case profiles may rely on other information, logic, data, etc. operational in a corresponding space profile, for example relating to the design and operation of the space (e.g., identification of the equipment/technology operational in the space, operational triggers/sensor points, operational business or specialty systems) and/or identification of job profiles and job step profiles for the space. Accordingly, space use case profiles are associated with space profiles that characterize spaces and identify devices, equipment, sensors, etc. for the space.

Space use case profiles may identify one or more triggers that may start execution of the corresponding space use case. For example, a space use case profile for "Prepare Conference Room" may be triggered by someone unlocking the space by swiping an ID card and/or by occupancy detection at the start of a scheduled meeting. Triggers may be environment-related (e.g., sensor-detected conditions such as light levels, temperature, occupancy), system related (e.g., outputs of other space use cases), and/or human related (e.g., user interaction with a user interface device). A space use case profile may also identify other inputs that may be used for use case execution (e.g., measurements such as air temperature, historical weather data, data from other space use cases).

Space use case profiles may be added, updated, and/or removed in one or more of the following ways in various embodiments: Space use case profiles may be added, updated, and/or removed at the space use case level (i.e., by directly editing a space use case profile). Space use case profiles may also be added, updated, and/or removed at the job step level, for example by adding, updating, or removing a job step profile in a job profile. The space use case profiles associated with the altered job step profile may be altered accordingly. Space use case profiles may also be added, updated, and/or removed at the job profile level, for example by adding, updating, and/or removing a job profile in a space profile. The associated job step profiles and space use case profiles may be altered accordingly.

Because space use cases are solution dependent (i.e., with multiple possible solutions for executing one job step) multiple space use case profiles may be associated with a single job step profile, for example as shown in FIG. 8 and described below. Various space use case profiles may characterize space use cases of varying degrees of automation (e.g., manual, fully automated, combination of manual and automated), luxury (e.g., good, better, best solutions), etc. Various space use case profiles may also be associated with various points of control of the same environmental condition (e.g., a mobile app and a wall panel). Various other factors that may differentiate various space use case profiles for the same job step profile include varying types of people using the system (e.g., varying roles, varying expertise, varying authorizations), various types of business systems and specialty systems (e.g., various scheduling, calendaring, or email systems, a nurse call system), and varying devices operational for a space among other possibilities. Accordingly, space use cases (embodied by space use case profiles) may be selected, enabled, activated, etc., in whole or in part, in accordance with such factors.

The modes design tool 908 facilitates the creation and editing of mode profiles that characterize modes. A mode profile is a data object (e.g., collection of data, computer code, logic, attributes) that defines a mode. A mode describes how a space is designed to operate under specific circumstances that are triggered by environmental events, human events, or system events (e.g., activating a space use case). In contrast to space use cases, in this formulation, a mode specifies particular low-level settings for equipment and devices. Modes may be characterized by unified logic (i.e., for multiple domains such as lighting and HVAC) unified settings (e.g., temperature and lighting setpoints) for the space across multiple domains. Modes may also be characterized by triggers that determine that the mode should be executed or entered into. A mode profile may also define a priority for a mode that may be used to facilitate conflict resolution between multiple active modes for a space. Modes and systems and methods relating to modes are described in detail in U.S. patent application Ser. No. 15/952,214 filed Apr. 12, 2018, incorporated by reference herein in its entirety. In some embodiments, each space use case profile identifies a corresponding mode profile that characterizes a mode that provides execution of the space use case. In some cases, one mode profile may be associated with multiple space use case profiles. The relationship between space use cases and modes (and between space use case profiles and mode profiles) is described in detail below.

The places and spaces design tool 910 is configured to facilitate design and creation of space profiles and place profiles. A space profile characterizes a set of requirements for the design, operation, and use of a space while a place profile characterizes a set of requirements of the design, operation, and use of a place. For the sake of brevity, references to space profiles herein also captures place profiles (e.g., a place profile may be thought of as a type of space profile). Space and place profiles are described in detail in U.S. patent application Ser. No. 15/952,173 filed Apr. 12, 2018, incorporated by reference herein in its entirety.

The modes design tool 908 and the places and spaces design tool 910 may include one or more circuits and/or software applications configured to provide a user (e.g., job designer, space use case designer) with one or more graphical user interfaces that allow the user to design, create, edit, etc. mode profiles and space profiles. The places and spaces design tool 910 and/or the modes design tool 908 may be suitable for use by a space profile designer (e.g., a person knowledgeable in building design, building domains, and space use) to design space profiles and/or mode profiles. In some embodiments, the places and spaces design tool 910 and/or the modes design tool 908 may be suitable for use by spaces applications engineers to develop applications that are available for selection in space profiles and can be used to execute use cases (e.g., applications executable on equipment in a space). Settings, triggers, priority etc. of such applications may be exposed in a user-friendly interface for manipulation by non-expert users of the places and spaces design tool 910 and/or the modes design tool 908.

As illustrated in FIG. 8, the job profiles design tool 902, the job step profiles design tool 904, the space use case design tool 906, the modes design tool 908, and the places and spaces design tool 910 are communicably coupled to a master profiles repository 912. The master profiles repository 912 stores "master" space use case profiles, job step profiles, job profiles, space profiles, place profiles, and/or mode profiles which are independent of particular end-customer design and/or installation. The master profiles repository 912 provides a starting point for profile "instances" that may be used for a particular place or space and/or for a particular customer or other entity.

The job profiles design tool 902 provides job profiles to the master profiles repository 112 and the master profiles repository 912 stores the job profiles. The job step profiles design tool 904 provides job step profiles to the master profiles repository 912 and the master profiles repository 912 stores the job step profiles. The space use case profiles design tool 902 provides space use case profiles to the master profiles repository 912 and the master profiles repository 912 stores the space use case profiles. The modes design tool 908 provides mode profiles to the master profiles repository 912 and the master profiles repository 912 stores the mode profiles. The places and spaces design tool 902 provides space profiles to the master profiles repository 912 and the master profiles repository 912 stores the space profiles.

The master profiles repository 912 may also receive associations between space use case profiles, job step profiles, job profiles, space profiles, place profiles, and/or mode profiles from one or more of the design tools 902-910. In response, the master profiles repository 912 may organize the space use case profiles, job step profiles, job profiles, space profiles, place profiles, and/or mode profiles accordingly, for example as shown in FIG. 8. As shown in FIG. 8, the master profiles repository 912 includes a place profile 914 that includes a space profile 916. The space profile 916 includes multiple job profiles, including Job Profile A 918 and Job Profile Z 920, indicating that a job associated with Job Profile A 918 and a job associated with Job Profile Z 920 may be completed at the space associated with the space profile 916. Each job profile includes multiple job step profiles. For example, Job Profile A 918 includes Job Step Profile A1 922 though Job Step Profile AN 924, indicating that Job Step Profile A1 922 though Job Step Profile AN 924 correspond to job steps that make up the job characterized by Job Profile A 918. Furthermore, each job step profile includes one or more space use case profiles, indicating that multiple solution dependent space use cases are possible for some solution-independent job steps. For example, Job Step Profile A1 922 is shown to include two space use case profiles, while Job Step Profile AN 924 is shown to include one space use case profile. The space profile 918 is also shown to include mode profiles 926 for that space.

The master profiles repository 912 thereby stores a variety of profiles that may be easily selected and retrieved for application in a particular building management system. The design tools 902-910 may be used to add, remove, edit, update, etc. profiles in the master profiles repository 912. It should be understood that the data structure illustrated in the master profiles repository 912 of FIG. 8 is included for illustrative purposes and is not intended to be limiting. Furthermore, although a single place profile 914 and a single space profile 916 are shown in the master profiles repository 912, it should be understood that the master profiles repository 912 may store any number of place profiles, space profiles, job profiles, job step profiles, space use case profiles, and mode profiles in various embodiments.

Referring now to FIG. 9, a system 1000 for customizing master profiles from the master profiles repository 112 for application in particular places and spaces and/or to meet the requirements of a particular customer, according to an exemplary embodiment. The system 200 includes the master profiles repository 912 communicably coupled to a customization tool 1002 and an instance profiles repository 1004. The instance profiles repository 1004 is shown as communicably coupled to the unified building management system 200, indicating that the unified building management system 200 may receive profiles from the instance profiles repository 1004.

The customization tool 1002 allows a planner designer to select master profiles (e.g., space profiles, job profiles, job step profiles, space use case profiles, mode profiles) from the mater profiles repository 912 and customize the profiles as needed for a particular place, space, building management system, customer, etc. The planner designer may be directed by a seller that works closely with a buyer/customer to determine the customer's needs for a place, determine the jobs and job steps to be completed in the space, the types of solutions (i.e., space use cases) suitable for the customer and the place, etc. The planner designer (e.g., using the customization tool 1002) may then identify a bundle (i.e., kit) of profiles from the master profiles repository 912 to offer to the customer/buyer that may satisfy the customer's needs. For example, in a case where multiple space use case profiles are included in a master job step profile, the customization tool 1002 may allow the planner designer to select one of the multiple space use case profiles to be used for that place/customer. Pricing may be based on the contents of the bundle. Bundles (kits) may be purchased to address particular outcomes for select space types and may determine which space profiles are used from the master profiles repository 912 for that place/customer. In some cases, the planner designer may select the outcomes the customer wants to achieve to create an appropriate bundle without specifying particular space profiles.

The customization tool 1002 may facilitate the planner designer in accessing and copying the profiles in the bundle from the master profiles repository 912. The customization tool 1002 may also facilitate the planner designer in altering any profile or element thereof to further tailor the profiles to the needs of a particular place and/or customer. The customization tool 1002 thereby facilitates the creation of "instance" profiles. The customization tool 1002 provides the instance profiles to the instance repository 1004 for storage therein. In some embodiments, as illustrated in FIG. 9, the customization tool 1002 may be skipped such that profiles from the master profiles repository 912 may be directly transferred to the instance profile repository 1004.

The instance profiles (e.g., space profiles, job profiles, job step profiles, space use case profiles, mode profiles in the instance profiles repository 1004) may then be installed for use in online control of spaces and places. In the example of FIG. 9, the instance profiles repository 1004 is communicable with the UBMS 200 to facilitate installation/implementation of the instance profiles in the UBMS 200. It should be understood that while FIG. 9 shows a UBMS 200, the profiles, framework, and related systems and process described herein may also be applied to various other building management systems, building equipment, etc.

In various embodiments, space profiles, job profiles, job step profiles, space use case profiles, mode profiles may be installed on various devices, equipment, sensors, controllers, networks, etc. of the UBMS 200. The system 1000 may also facilitate troubleshooting, configuration, verification, and validation to ensure that use cases execute successfully in online control. In some embodiments, profiles may be added, removed, edited, updated, etc. on the UBMS 200 during online use. Instance profiles may be plug-and-play such that instance profiles can be installed on the UBMS 200 without expert intervention. Various devices, equipment, sensors, controllers, networks, etc. of the UBMS 200 may then be controlled and/or operated in accordance with the profiles to provide space use cases and facilitate execution of jobs and job steps at spaces and places.

Accordingly, the space use cases available for a space may be included in an instance space profile installed for on the UBMS 200 that serves the space. In some cases, the instance space profile installed for a UBMS 200 corresponds to the space use case repository 308 of FIG. 3A. In such an embodiment, the instance space profile may include instance job step profiles that include multiple space use case profiles that may be enabled or disabled for the space depending upon what devices are available to serve the space as determined in real time for online control as described above with reference to FIGS. 3-6. Additionally, in a situation where the instance space profile installed for a UBMS does not include a space use case profile configured to utilize a particular collection of devices available at a space, the profiles repository may be accessed to locate an applicable space use case profile. The architecture shown in FIGS. 8-9 thereby supports the system 300 of FIG. 3A and the UBMS 200.

Referring now to FIG. 10, an example of a space use case profile 1100 is shown, according to an exemplary embodiment. As shown in FIG. 10, the space use case profile 1100 includes the information and logic require to select and execute a space use case based on the devices available at a space. In the example shown, the space use case profile 1100 is deployed for use at a space, namely "Conference Room 102" of the "Offices Building" on the "Main Campus" for the example enterprise customer. The space use case profile 1100 facilitates a space use case "conference" for the Conference Room 102 that includes a "Presentation" mode and a "Conversation" mode.

As illustrated by FIG. 10, the space use case profile 1100 can involve various devices or domains. For example, the space use case profile 1100 includes an HVAC specification 1102, a lighting specification 1104, and a shades specification 1106 for the two modes. Each specification 1102-1106 includes a network destination field, a settings field, and a "required" flag.

The "required" flag for each specification 1102-1106 may be set to be true or false. If the "required" flag is set to true, a corresponding space use case will not be enabled unless the corresponding domain or device is operational to serve the space. In some scenarios, other devices utilized in the space use case may be operational, but will not be controlled in accordance with the space use case unless the required device(s) or domain(s) is operational. If the "required" flag is set to false, the space use case can be enabled even if the corresponding device or domain is not available to serve the space. In the example shown, all "required" flags are set to false. Accordingly, in the example shown in FIG. 10, if at least one device of at least one of the domains shown (i.e., HVAC domain, lighting domain, shades domain) is operational, the space uses case of FIG. 11 will be enabled. Because the HVAC domain and the lighting domain are operational in the example shown, the "conference" space use case is enabled.

The network destination fields provide information that facilitates network communication with the device(s) of the corresponding domain, for example an IP address for HVAC equipment or for a lighting device. When a network destination field is populated, the space use case is enabled and configured to involve the corresponding domain when the space use case is provided. In some cases, "enabling" a space use case is accomplished by populating the network destination field(s) for the required domain(s) or device(s) in the space use case profile.

The settings fields provide settings for the devices of the corresponding domain. In the example shown, providing the space use case includes distributing the settings listed in the space use case profile 1100 to the corresponding devices, i.e., to the network destinations listed in the corresponding network destination fields. The devices are thereby controlled in accordance with the space use case defined by the space use case profile 1100.

In the example shown, HVAC and lighting devices are operational, as indicated by the fact that the destination files for the HVAC specification 1102 and the lighting specification 1104 are populated. Settings specified by the space use case profile 1100 will therefore be distributed to the HVAC and lighting devices when the space use case profile is active. Also in the example shown, shades are not operational at the space (e.g., there are no shades in the space, any shades in the space are controlled manually, etc.). Accordingly, the destination field in the shades specification 1106 is set to null. Because the destination field in the shades specification 1106 is set to null, the space use case is not extended to involve shades and no attempt to control shades will be made when the space use case is active. If shades are installed and connected to the UBMS to become operational at the space, the destination field in the shades specification 1106 will be populated, thereby extending the space use case to involve the shades domain such that settings will be distributed to the shades when the space use case is active.

In some embodiments of the example of FIG. 11, while the "conference" space use case is enabled, a user mobile application of a user device provides a user with an option to select the presentation or conversation mode for the space. In such an embodiment, when a user selects the presentation mode or the conversation mode, the settings associated with the selected mode (i.e., as shown in the settings fields) are distributed to the corresponding devices (i.e., as indicated in the network destination fields) to control the devices in accordance with the selected mode.

The space use case profile 1100 shows one example while many other examples and implementations are contemplated by the present disclosure. It should be understood that the example space use case profile 1100 is shown for illustrative purposes only and should not be considered to be limiting.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A controller for a space served by a plurality of devices, each device associated with one of a plurality of different building domains, the controller comprising:
   one or more processors operably coupled to one or more computer-readable storage media and configured to execute instructions stored in the computer-readable storage media to:
      determine a plurality of use cases defined for the space, each use case associated with a required set of building domains;
      determine, for each of the different building domains, whether devices of building equipment are operational to serve the space;
      determine a set of enabled use cases by, for each use case, enabling the use case if the devices of building equipment are operational to serve the space for each building domain in the required set of building domains; and
      control the plurality of devices in accordance with the set of enabled use cases.

2. The controller of claim 1, wherein the one or more processors are configured to execute instructions stored in the computer-readable storage media to:
   obtain an indication that an additional device associated with an additional domain became operational to serve the space; and
   extend a first use case of the set of enabled use cases to include the additional domain.

3. The controller of claim 2 wherein the devices operational to serve the space comprise a first device associated with a first domain and the additional device associated with the additional domain;
   wherein the one or more processors are configured to execute instructions to extend the first use case of the set of enabled use cases to include the additional domain by:
      enabling a portion of the use case corresponding to the additional domain; and
      modifying a portion of the use case corresponding to the first domain.

4. The controller of claim 1, wherein the one or more processors are configured to execute instructions stored in the computer-readable storage media to:

determine that the devices of building equipment for a first domain of the plurality of different building domains became non-operational;
update the set of enabled use cases by, for each use case in the set of enabled use cases, disabling the use case if the required set of building domains for the use case comprises the first domain.

5. The controller of claim 1, wherein the one or more processors are configured to execute instructions stored in the computer-readable storage media to:
obtain an indication that an additional device associated with an additional domain became operation to serve the space; and
update the set of enabled use cases by:
enabling a first use case of the plurality of use cases, the set of required domains for the first use case comprising the additional domain; and
disabling a second use case of the set of enabled use cases in response to a determination that the first use case is preferred over the second use case.

6. The controller of claim 1, wherein each use case specifies a trigger condition and settings for a subset of the devices; and
wherein the one or more processors are configured to execute instructions to control the plurality of devices in accordance with the set of enabled use cases by:
detecting an occurrence of the trigger condition; and
in response to detecting the occurrence of the trigger condition, distributing the settings to the subset of devices, wherein distributing the settings to the subset of the devices causes the subset of devices to operate in accordance with the settings.

7. The controller of claim 1, wherein the one or more processors are configured to execute the instructions to determine, for each of the different building domains, whether the devices of building equipment are operational to serve the space by:
detecting a presence of the devices; and
obtaining, for each of the devices, an indication of a domain of the device.

8. The controller of claim 7, wherein obtaining the indication of the domain of the device comprises reading a device domain attribute from a common data model used by the one or more processors and the devices.

9. The controller of claim 1, wherein the one or more processors are configured to execute instructions to:
for each building domain for which the devices are determined to be operational, determine a type of each of the devices;
enable capabilities of the enabled use cases based on the type of each of the devices; and
control the devices to provide the capabilities in accordance with the enabled use cases.

10. The controller of claim 9, wherein the one or more processors are configured to execute instructions to:
determine that a device of a first type has become non-operational;
disable a first capability corresponding to the first type.

11. The controller of claim 9, wherein the one or more processors are configured to execute instructions to disable a first capability of the enabled use cases in response to enabling a second capability of the enabled use cases, the second capability preferred over the first capability.

12. A method of controlling a plurality of devices that serve a space, each device associated with one of a plurality of different building domains, the method comprising:
determining a plurality of use cases defined for the space, each use case associated with a required set of building domains;
determining, for each of the different building domains, whether devices of building equipment are operational to serve the space;
determining a set of enabled use cases by, for each use case, enabling the use case if the devices of building equipment are operational to serve the space for each building domain in the required set of building domains; and
controlling the plurality of devices in accordance with the set of enabled use cases.

13. The method of claim 12, comprising:
obtaining an indication that an additional device associated with an additional domain became operational to serve the space; and
extending a first use case of the set of enabled use cases to include the additional domain.

14. The method of claim 12, comprising:
determining that the devices of building equipment for a first domain of the plurality of different building domains became non-operational;
updating the set of enabled use cases by, for each use case in the set of enabled use cases, disabling the use case if the required set of building domains for the use case comprises the first domain.

15. The method of claim 12, comprising:
obtaining an indication that an additional device associated with an additional domain became operation to serve the space; and
updating the set of enabled use cases by:
enabling a first use case of the plurality of use cases, the set of required domains for the first use case comprising the additional domain; and
disabling a second use case of the set of enabled use cases in response to a determination that the first use case is preferred over the second use case.

16. The method of claim 12, wherein each use case specifies a trigger condition and settings for a subset of the devices; and
wherein controlling the plurality of devices in accordance with the set of enabled use cases comprises:
detecting an occurrence of the trigger condition; and
in response to detecting the occurrence of the trigger condition, distributing the settings to the subset of devices, wherein distributing the settings to the subset of the devices causes the subset of devices to operate in accordance with the settings.

17. The method of claim 12, wherein determining, for each of the different building domains, whether the devices of building equipment are operational to serve the space comprises:
detecting a presence of the devices; and
obtaining, for each of the devices, an indication of a domain of the device.

18. The method of claim 17, wherein obtaining the indication of the domain of the device comprises reading a device domain attribute from a common data model used by one or more processors and the devices.

19. The method of claim 12, comprising:
for each building domain for which the devices are determined to be operational, determining a type of each of the devices;
enabling capabilities of the enabled use cases based on the type of each of the devices; and controlling the devices to provide the capabilities in accordance with the enabled use cases.

20. The method of claim 19, comprising:
determining that a device of a first type has become non-operational;
disabling a first capability corresponding to the first type.

21. The method of claim 19, comprising disabling a first capability of the enabled use cases in response to enabling a second capability of the enabled use cases, the second capability preferred over the first capability.

22. The method of claim 12, wherein enabling the use case comprises:
retrieving a use case profile from a repository; and
installing the use case profile on a space controller.

23. The method of claim 12, wherein enabling the use case comprises populating a destination field of a use case profile for each device in a subset of the devices, the destination field facilitating network communications between a space controller and the device.

24. One or more non-transitory computer-readable media containing program instructions that, when executed by one or more processors, cause the one or more processors to perform operations comprising:
determining a plurality of use cases defined for a space, each use case associated with a required set of building domains;
determining, for each of different building domains, whether devices of building equipment are operational to serve the space;
determining a set of enabled use cases by, for each use case, enabling the use case if the devices of building equipment are operational to serve the space for each building domain in the required set of building domains; and
controlling the devices in accordance with the set of enabled use cases.

25. The non-transitory computer-readable media of claim 24, the operations further comprising:
obtaining an indication that an additional device associated with an additional domain became operational to serve the space; and
extending a first use case of the set of enabled use cases to include the additional domain.

26. The non-transitory computer-readable media of claim 24, wherein each use case specifies a trigger condition and settings for a subset of the devices; and
wherein controlling the plurality of devices in accordance with the set of enabled use cases comprises:
detecting an occurrence of the trigger condition; and
in response to detecting the occurrence of the trigger condition, distributing the settings to the subset of devices, wherein distributing the settings to the subset of the devices causes the subset of devices to operate in accordance with the settings.

27. The non-transitory computer-readable media of claim 24, wherein determining, for each of the different building domains, whether the devices of building equipment are operational to serve the space comprises:
detecting a presence of the devices; and
obtaining, for each of the devices, an indication of a domain of the device.

28. The non-transitory computer-readable media of claim 24, the operations comprising:
for each building domain for which devices are determined to be operational, determining a type of each of the devices; and
enabling capabilities of the enabled use cases based on the type of each of the devices;
controlling the devices to provide the capabilities in accordance with the enabled use cases.

29. The non-transitory computer-readable media of claim 24, wherein enabling the use case comprises populating a destination field of a use case profile for each device in a subset of the devices, the destination field facilitating network communications between a space controller and the device.

* * * * *